United States Patent
Mizoguchi

(10) Patent No.: US 12,462,620 B2
(45) Date of Patent: Nov. 4, 2025

(54) VEHICLE SERVER SYSTEM

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 192 days.

(21) Appl. No.: 18/169,486

(22) Filed: Feb. 15, 2023

(65) Prior Publication Data

US 2023/0290190 A1    Sep. 14, 2023

(30) Foreign Application Priority Data

Mar. 9, 2022    (JP) .................................. 2022-036471

(51) Int. Cl.
| | |
|---|---|
| *G07C 5/00* | (2006.01) |
| *G07C 5/02* | (2006.01) |
| *H04W 4/021* | (2018.01) |
| *H04W 4/44* | (2018.01) |

(52) U.S. Cl.
CPC .............. *G07C 5/008* (2013.01); *G07C 5/02* (2013.01); *H04W 4/021* (2013.01); *H04W 4/44* (2018.02)

(58) Field of Classification Search
CPC ......... G07C 5/008; G07C 5/02; H04W 4/021; H04W 4/44
USPC ....................................................... 701/31.4
See application file for complete search history.

(56) References Cited

U.S. PATENT DOCUMENTS

| | | | | |
|---|---|---|---|---|
| 7,310,760 | B1 * | 12/2007 | Sun .......................... | G06F 11/27 |
| | | | | 714/745 |
| 2006/0101465 | A1 * | 5/2006 | Kato .................. | G05B 19/0421 |
| | | | | 718/100 |
| 2014/0125281 | A1 * | 5/2014 | Mitsutani ................ | B60L 1/003 |
| | | | | 320/109 |
| 2015/0253703 | A1 * | 9/2015 | Takane ............... | G03G 15/2039 |
| | | | | 399/70 |
| 2018/0203683 | A1 * | 7/2018 | Kim .......................... | G06F 8/65 |
| 2018/0215380 | A1 * | 8/2018 | Devi ....................... | H04L 67/52 |

(Continued)

FOREIGN PATENT DOCUMENTS

| | | |
|---|---|---|
| JP | 2019-133498 A | 8/2019 |
| WO | 2018/179392 A1 | 10/2018 |
| WO | WO-2021150224 A1 * 7/2021 ............ B60L 53/305 |

*Primary Examiner* — Krishnan Ramesh
(74) *Attorney, Agent, or Firm* — Rimon P.C.

(57) ABSTRACT

A vehicle server system includes a vehicle and a server apparatus. The vehicle is chargeable, and includes at least a control apparatus configured to execute a calculation processing, and an external communication apparatus. The server apparatus includes a server communicator and a server processor. The server communicator is configured to communicate with the external communication apparatus of the vehicle. The server processor configured to execute at least traveling control on the vehicle on the basis of data transmitted and received by the server communicator. The server communicator receives vehicle state data of the vehicle from the vehicle. The server processor is configured to determine whether time of a location where the vehicle from which the vehicle state data is received is on charge is nighttime, and, upon determining that the vehicle is on charge in the nighttime, execute control to cause the control apparatus to execute the calculation processing.

13 Claims, 11 Drawing Sheets

(56) References Cited

U.S. PATENT DOCUMENTS

| | | | | |
|---|---|---|---|---|
| 2019/0349394 A1* | 11/2019 | Kishikawa | .......... | H04L 63/1416 |
| 2020/0117438 A1* | 4/2020 | Withun | .................... | G06F 8/65 |
| 2020/0355506 A1 | 11/2020 | Muto | | |
| 2021/0097784 A1* | 4/2021 | Castano | ................. | G07C 5/008 |
| 2021/0201599 A1* | 7/2021 | Shionoya | ............. | G07C 5/0841 |
| 2022/0169268 A1* | 6/2022 | Chiba | .................. | B60W 50/06 |
| 2022/0221306 A1* | 7/2022 | Chikamori | ......... | G01C 21/3841 |
| 2022/0291919 A1* | 9/2022 | Nakamura | ................ | G06F 8/66 |
| 2023/0217301 A1* | 7/2023 | Lee | ...................... | H04W 76/14 |
| | | | | 370/310 |
| 2024/0272894 A1* | 8/2024 | Green | .................... | B60L 58/10 |

\* cited by examiner

| KIND OF SERVER CONTROL |
|---|
| TRAVELING CONTROL |
| MAP UPDATE |
| LOCATION CORRECTION CONTROL |
| VEHICLE MANAGEMENT (UPDATE) |
| TRAVEL LOG ANALYSIS (MALFUNCTION DIAGNOSIS) |
| USER SERVICE |
| ⁂ |

FIG. 5

VEHICLE SERVER SYSTEM

CROSS-REFERENCE TO RELATED APPLICATIONS

The present application claims priority from Japanese Patent Application No. 2022-036471 filed on Mar. 9, 2022, the entire contents of which are hereby incorporated by reference.

BACKGROUND

The disclosure relates to a vehicle server system.

For a vehicle such as an automobile, a technique has been developed to cause the vehicle to travel under remote control by a server apparatus. Reference is made to Japanese Unexamined Patent Application Publication No. 2019-133498 and International Publication No. WO 2018/179392.

SUMMARY

An aspect of the disclosure provides a vehicle server system including a vehicle and a server apparatus. The vehicle is chargeable, and includes at least a control apparatus and an external communication apparatus. The control apparatus is configured to execute a calculation processing. The server apparatus includes a server communicator and a server processor. The server communicator is configured to communicate with the external communication apparatus of the vehicle. The server processor is configured to execute at least traveling control on the vehicle on the basis of data transmitted and received by the server communicator. The server communicator is configured to receive vehicle state data of the vehicle from the vehicle. The server processor is configured to determine whether time of a location where the vehicle from which the vehicle state data is received is on charge is nighttime. The server processor is configured to, upon determining that the vehicle is on charge in the nighttime, execute control to cause the control apparatus in the vehicle to execute the calculation processing.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is an explanatory diagram illustrating an example of various kinds of control to be executed by the server apparatus in the vehicle server system of FIG. 1.

DETAILED DESCRIPTION

Figure 1:
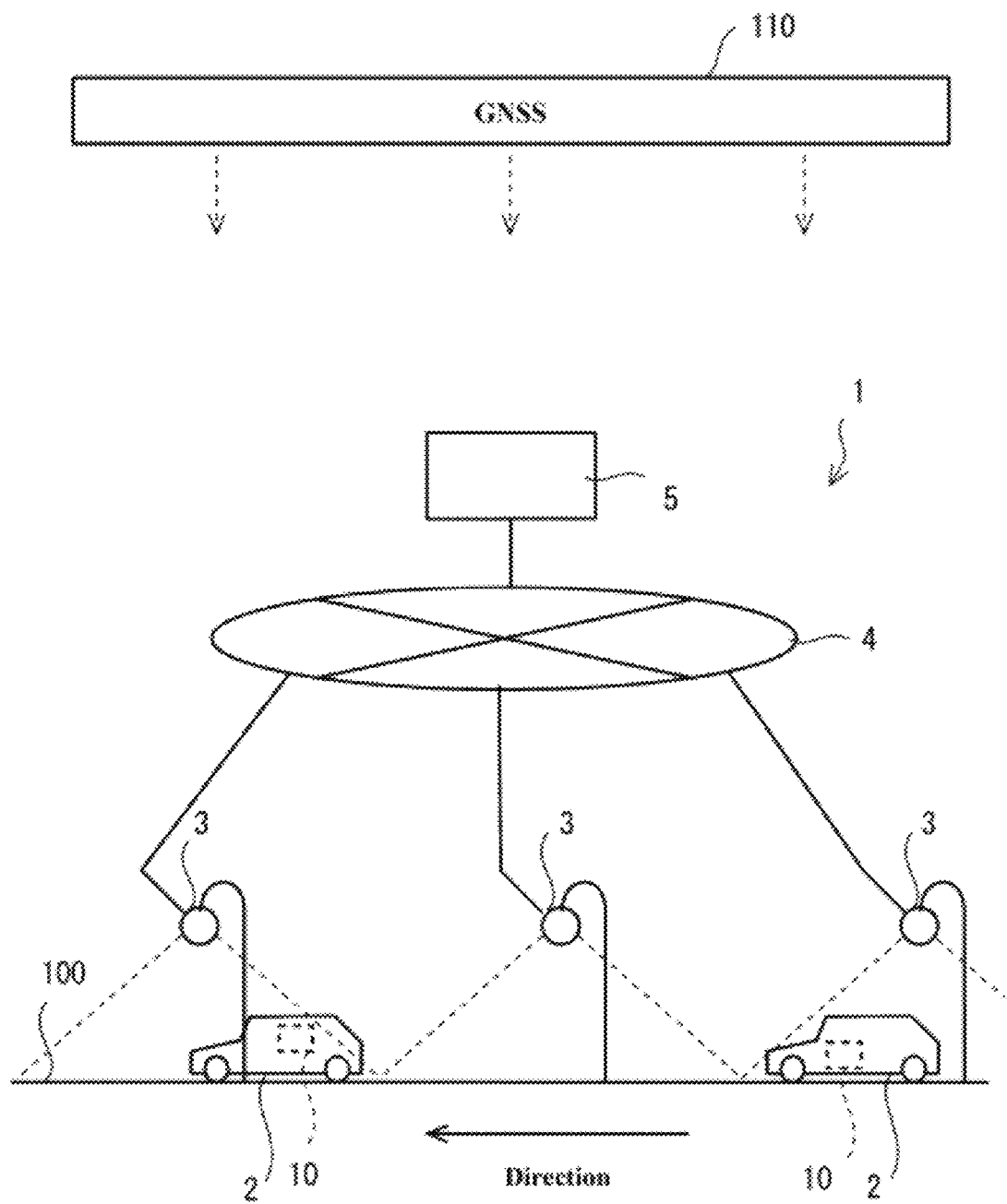
FIG. 1 is a configuration diagram illustrating a vehicle server system according to one example embodiment of the disclosure.

A vehicle server system including a server apparatus and a vehicle is intended to remotely control traveling of the vehicle. A high data processing capability is thus demanded of the server apparatus. The larger the number of vehicles to undergo traveling control by the vehicle server system, the higher the data processing capability demanded of the server apparatus. Accordingly, the vehicle server system may be expected to include multiple server apparatuses to achieve enhancement of the data processing capability.

On the other hand, increasing the performance of each server apparatus or the number of server apparatuses for use in the vehicle server system can lead to concern about, for example, apparent transmission delays between the server apparatuses and increases in system cost.

It is desirable to provide a vehicle server system that makes it possible to provide an enhanced data processing capability.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is a configuration diagram illustrating a vehicle server system 1 according to a first example embodiment of the disclosure.

The vehicle server system 1 of FIG. 1 may be configured to remotely control traveling of a vehicle. 2. The vehicle server system 1 includes a server apparatus 5. The vehicle server system 1 may include multiple vehicles 2 communicable with the server apparatus 5. The server apparatus 5 may remotely control the traveling of the vehicles 2. The server apparatus 5 may be coupled to a communication network 4. Base stations 3 may be coupled to the communication network 4.

FIG. 1 also illustrates a global navigation satellite system (GNSS) satellite 110 outputting GNSS radio waves receivable by the vehicles 2 and the server apparatus 5. By receiving the radio waves from multiple GNSS satellites 110, each vehicle 2 or the server apparatus 5 is able to obtain its location and time based on a common positioning system.

In the vehicle server system 1 of FIG. 1, only a single server apparatus 5 is illustrated for clarification of description; however, the actual vehicle server system 1 may include multiple server apparatuses 5 configured to cooperate with each other.

The vehicle 2 may be an automobile, for example. Other non-limiting examples of the vehicle 2 may include a motorcycle, a cart, and a personal mobility. The vehicle 2 may travel on, for example, a road by means of a drive force generated by an engine or a motor serving as a power source provided in the own vehicle. The vehicle 2 may basically execute traveling control based on manual driving on the basis of an operation performed by an occupant. The vehicle 2 may also execute traveling control of assisting manual driving on the basis of a detection result obtained by the own vehicle, and may execute traveling control based on automatic driving.

The base stations 3 may include, for example, those of carrier communication networks for mobile terminals, etc., and those for Intelligent Transport Systems (ITS) service or Advanced Driver Assistance Systems (ADAS) service for the vehicles 2. The base stations 3 for the carrier networks may be, for example, the fifth-generation base stations 3. As illustrated in FIG. 1, the base stations 3 may be installed along a road on which the vehicles 2 travel. The base stations 3 may be fixedly installed on, for example, buildings, or may be mounted on any of mobile bodies including, for example, the vehicles 2, vessels, drones, and aircrafts.

The base station 3 may establish a wireless communication path for transmission and reception of data to and from the vehicle 2 present in a broken-line zone illustrated in FIG. 1. In a case where the vehicle 2 travels on the road to move into the zone, handover control may be executed between the base stations 3 to switch from one base station 3 to another base station 3 establishing a wireless communication path to the vehicle 2. This makes it possible for the vehicle 2 to be coupled to the communication network 4 all the time during traveling, while changing the wireless communication paths to the multiple base stations 3 arranged along, for example, the road on which the vehicle 2 travels. The fifth-generation base stations 3 are able to perform higher-speed and larger-capacity data transmission and reception to and from the vehicles 2, as compared with the fourth-generation base stations 3. Further, some of the fifth-generation base stations 3 are provided with a calculation processing capability.

The communication network 4 may be configured by, for example, a communication network for the carrier communication network, a communication network for the ITS service or the ADAS service, or the Internet, which is an open, wide-area communication network. The communication network 4 may include a dedicated communication network for the vehicle server system 1.

Figure 2:
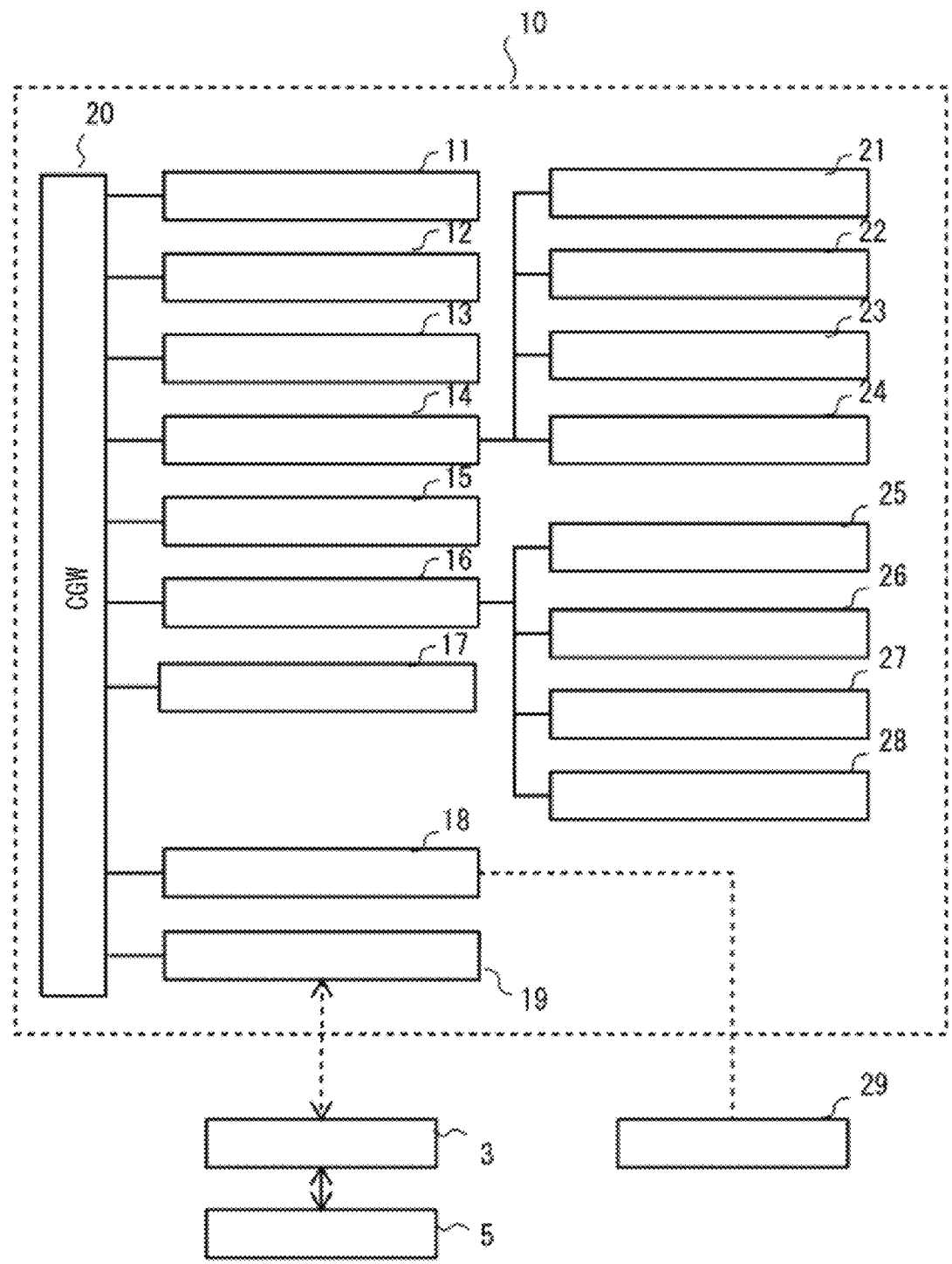
FIG. 2 is a configuration diagram illustrating a control system of a vehicle of FIG. 1.

FIG. 2 is a configuration diagram illustrating a control system 10 of the vehicle 2 of FIG. 1.

Figure 10:
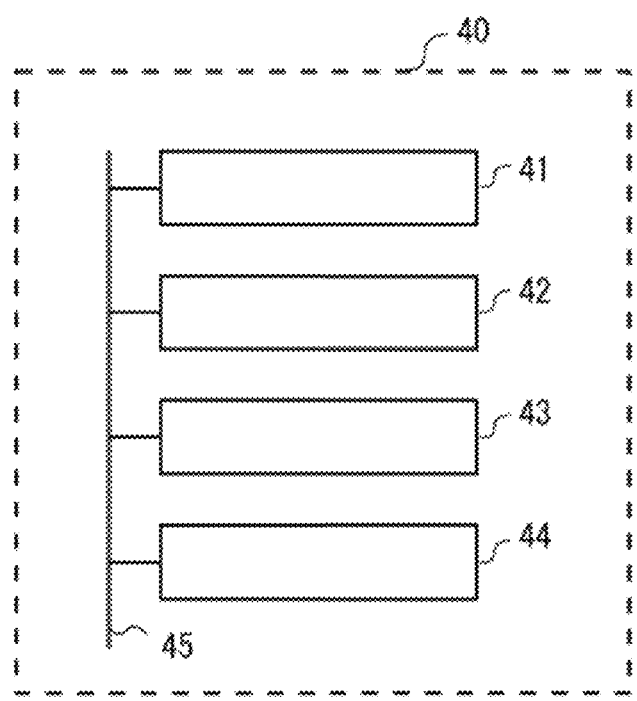
FIG. 10 is a basic hardware configuration diagram illustrating a control apparatus for use in the control system of FIG. 2 of the vehicle.

The control system 10 of FIG. 2 may include multiple control apparatuses 40 including a traveling control apparatus 15. The traveling control apparatus 15 may execute automatic driving. For the control apparatuses 40, a basic configuration example is illustrated in FIG. 10 to be described later. FIG. 2 illustrates, as the control apparatuses 40, a driving control apparatus 11, a steering control apparatus 12, a braking control apparatus 13, an operation detection apparatus 14, the traveling control apparatus 15, a detection control apparatus 16, an air conditioning apparatus 17, a charging control apparatus 18, and an external communication apparatus 19. The control system 10 of the vehicle 2 may further include, for example, an occupant monitoring apparatus, a short-range communication apparatus, and an alarm apparatus. Each of these control apparatuses 40 may basically include an electronic control unit (ECU) 44 as illustrated in FIG. 10 to be described later, and include a calculation processing capability provided by the ECU 44.

The control apparatuses 40 may each be coupled to a central gateway (CGW) 20 via a cable. The CGW 20 may configure a vehicle network. Multiple cables may be coupled to the CGW 20. The control apparatuses 40 may be star-coupled or bus-coupled to the CGW 20. The vehicle network may be based on a standard such as a controller area network (CAN) or a local interconnect network (LIN). Alternatively, the vehicle network may be based on a general-purpose wired communication standard such as a local area network (LAN), or a wireless communication standard. An identification (ID) may be assigned to each of the control apparatuses 40 for distinction from the other control apparatuses 40. The control apparatuses may each input and output, via the vehicle network, various pieces of data in packets with a destination ID and a transmission source ID added thereto. The CGW 20 may monitor the packets on the vehicle network and perform routing thereon. The CGW 20 may verify the packets against a list and control the routing. The CGW 20 may basically include the ECU 44 and include the calculation processing capability provided by the ECU 44. The CGW 20 may serve as the control apparatus 40 of the network of the vehicle 2.

The driving control apparatus 11 may control the drive source and a drive force transmission mechanism of the vehicle 2. The drive force transmission mechanism may include, for example, a decelerator and a central differential. The drive force transmission mechanism may control magnitudes of the drive forces to be transmitted to wheels of the vehicle 2 on an individual basis.

The steering control apparatus 12 may control a steering device that changes orientations of the front wheels of the vehicle 2. The vehicle 2 may change traveling direction in response to changes in orientation of the wheels.

The braking control apparatus 13 may control a braking device that brakes the wheels of the vehicle 2 on an individual basis. The braking device may control magnitudes of braking forces to be exerted on the wheels of the vehicle 2 on an individual basis.

Operation members may be coupled to the operation detection apparatus 14. The operation members may be provided in the vehicle 2 to allow an occupant of the vehicle 2 to perform operations related to traveling of the vehicle 2. The operation members may include, for example, a steering 21, an accelerator pedal 22, a brake pedal 23, and a touch panel 24. The operation detection apparatus 14 may detect, for example, whether any operation has been performed and an amount of the operation for each operation member, and may output operation data to the vehicle network. To perform operations related to traveling of the vehicle 2, an occupant may operate the steering 21, the accelerator pedal 22, and the brake pedal 23. Further, the occupant may operate the touch panel 24 to make various settings on the vehicle 2. The touch panel 24 may display a setting screen. By operating the touch panel 24, the occupant may, for example, activate or deactivate automatic driving including driving assist, or make settings related to assistance of the server apparatus 5 to be described later. The touch panel 24 may be provided in the middle of a front part of a compartment of the vehicle 2, for example.

Detection members may be coupled to the detection control apparatus 16. The detection members may detect a traveling state and a traveling environment of the vehicle 2. The detection members may include, for example, a GNSS receiver 25, an exterior camera 26, a light detection and ranging (LiDAR) 27, and an acceleration sensor 28.

The GNSS receiver 25 may receive radio waves from the GNSS satellites 110 and generate data on a current location and a current time of the vehicle 2 equipped with the GNSS receiver 25. The GNSS receiver 25 may be able to receive ground waves or radio waves from a quasi-zenith satellite to thereby generate highly accurate data on the current location and the current time.

The exterior camera 26 may capture an image of the outside of the vehicle 2 which travels on, for example, a road. The vehicle 2 may be provided with multiple exterior cameras 26. The multiple exterior cameras 26 may capture images of an environment around the vehicle 2 in forward, backward, rightward, and leftward directions. Images to be captured by the exterior cameras 26 may include an image of, for example, another vehicle 2 located around the own vehicle 2. For example, the vehicle 2 may capture images of at least a forward side in the traveling direction of the vehicle 2.

The LiDAR 27 may scan with a laser the outside of the vehicle 2 which travels on, for example, a road, and may generate outside-vehicle space data on the basis of a reflected wave of a laser beam. The outside-vehicle space data may include the image of, for example, another vehicle 2 located around the own vehicle 2. The exterior camera 26 and the LiDAR 27 may serve as sensors that detect another vehicle 2 located around the own vehicle 2.

The acceleration sensor 28 may detect accelerations in axial directions including a front-rear direction, a left-right direction, and an up-down direction of the vehicle 2, for example. In this case, the acceleration sensor 28 may be able to detect accelerations in a yaw direction, a roll direction, and a pitch direction of the vehicle 2.

The detection control apparatus 16 may output pieces of detection data obtained by the various detection members provided in the own vehicle 2 to the vehicle network. The detection control apparatus 16 may generate data on the basis of the detection data, for example, detection data on the other vehicle 2 located around the own vehicle 2, and may output the generated data to the vehicle network.

The air conditioning apparatus 17 may include, for example, a heater and an evaporator, and may control the temperature, etc. of the compartment in which occupants are seated in the vehicle 2.

The charging control apparatus 18 may control charging of an unillustrated battery of the vehicle 2. A large-capacity secondary battery may be used in the vehicle 2 configured to travel by means of electric power stored in the battery. Secondary batteries are to undergo charging appropriate to their battery characteristics, for example. Charging of the large-capacity secondary battery may basically take time. For example, it may take about several hours to fully charge the battery of the vehicle 2 with a charging apparatus 29 using a commercial voltage of 100 V. In contrast, in a case of charging with the charging apparatus 29 using a commercial voltage of 200 V or using stored electric power, the battery of the vehicle 2 may be chargeable up to about 80% in about one hour. An electric current suppliable by the charging apparatus 29 during charging can sometimes be limited depending on performance of the charging apparatus 29 itself or equipment of an electric power network to which the charging apparatus 29 is coupled. In such a case, it is difficult for the vehicle 2 to charge the battery thereof at maximum electric power that the vehicle 2 is able to receive.

The external communication apparatus 19 may establish a wireless communication path to the base station 3 provided near, for example, a road outside the vehicle 2. The base station 3 may be a base station of a carrier, or may be a base station for advanced traffic information. The external communication apparatus 19 may, via the base station 3, transmit and receive data to and from the server apparatus 5 or other apparatuses coupled to the base station 3. The server apparatus 5 may be provided in correspondence with the base station 3. In a case where the fifth-generation base station 3 is provided with a function as the server apparatus 5, it is possible for the external communication apparatus 19 of the vehicle 2 to execute a high-speed and large-capacity communication with the server apparatus 5 of the base station 3.

The traveling control apparatus 15 may control the traveling of the vehicle 2.

The traveling control apparatus 15 may execute traveling control on the vehicle 2 based on operations of a driver who drives the vehicle 2, traveling control on the vehicle 2 by assisting the driver's operations, and traveling control based on automatic driving without the driver's operations.

For example, the traveling control apparatus 15 may generate a control value used to assist the driver's operation on the basis of data from the operation detection apparatus 14, and may output the generated control value to the driving control apparatus 11, the steering control apparatus 12, and the braking control apparatus 13.

The traveling control apparatus 15 may, on the basis of data from the detection control apparatus 16 and high-precision map data, execute lane keep control to keep a traveling lane and preceding-vehicle following control to thereby generate and output a control value for automatic driving.

Figure 3:
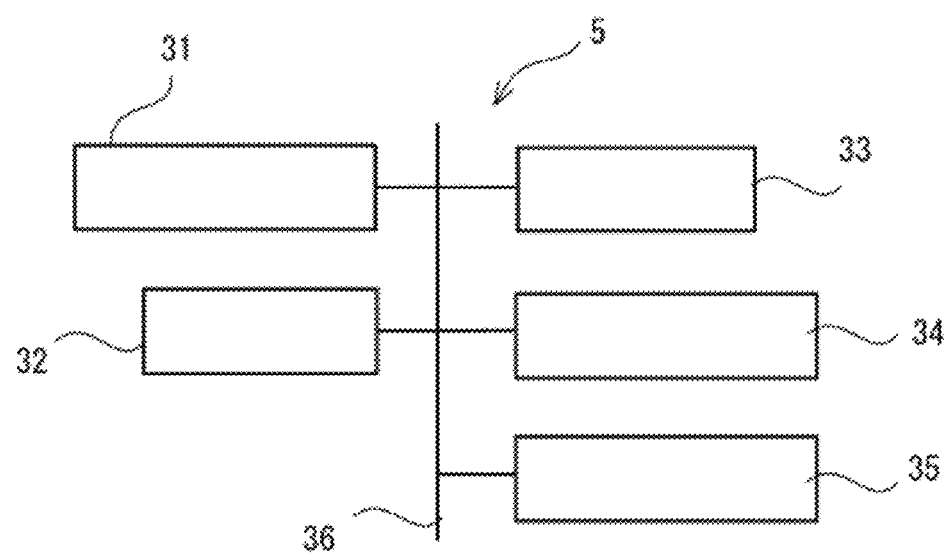
FIG. 3 is a hardware configuration diagram illustrating a server apparatus of FIG. 1.

FIG. 3 is a hardware configuration diagram illustrating the server apparatus 5 of FIG. 1.

The server apparatus 5 of FIG. 3 may include a server communication device 31, a server GNSS receiver 32, a server timer 33, a server memory 34, a server CPU 35, and a server bus 36. The server communication device 31, the server GNSS receiver 32, the server timer 33, the server memory 34, and the server CPU 35 may be coupled to the server bus 36.

The server communication device 31 may be coupled to the communication network 4. The server communication device 31 may transmit and receive data to and from another device, such as the base station 3 or the control system 10 of the vehicle 2, coupled to the communication network 4. The server communication device 31 is configured to receive vehicle state data from the vehicle 2. In one embodiment, the server communication device 31 may serve as a "server communicator".

The server GNSS receiver 32 may receive the radio waves from the GNSS satellites 110 to obtain a current time.

The server timer 33 may measure a time and a time period. The time of the server timer 33 may be calibrated by the current time of the server GNSS receiver 32.

The server memory 34 may hold a program to be executed by the server CPU 35, and data.

The server CPU 35 may read the program from the server memory 34 and execute the program. This enables a server processor to be implemented in the server apparatus 5.

The server CPU 35 may control the operation of the server apparatus 5. The server CPU may execute control appropriate to the vehicle server system 1. In one embodiment, the server CPU 35 may serve as a "server processor".

The server CPU 35 may acquire respective pieces of own vehicle data from the vehicles 2 subjected to remote traveling control by the server apparatus 5, and may generate a traveling control value for controlling the traveling of each vehicle 2. The traveling control value may be a value to be outputted to the driving control apparatus 11, the steering control apparatus 12, or the braking control apparatus 13 of each vehicle 2, or may be a value usable to generate the value to be outputted to the driving control apparatus 11, the steering control apparatus 12, or the braking control apparatus 13 of each vehicle 2. In this case, on the basis of data transmitted and received by the server communication device 31, the server CPU 35 as the server processor may control the traveling of the vehicles 2 that use the vehicle server system 1.

For example, the server CPU 35 may mange data received from each of the vehicles 2, control generation of the traveling control value for the vehicle 2 having transmitted the data, and control transmission, to the vehicle 2 having transmitted the data, of the traveling control value generated for that vehicle 2. In this case, for example, the data received from the vehicles 2 and the high-precision map data for use to generate the traveling control value may be stored in the server memory 34. The server CPU 35 may repeat the generation and transmission of the traveling control value for each vehicle 2 by repeatedly receiving the latest data from the vehicle 2. This makes it possible for each vehicle 2 to continue the traveling based on the traveling control value repeatedly generated by the server apparatus 5.

Figure 4:
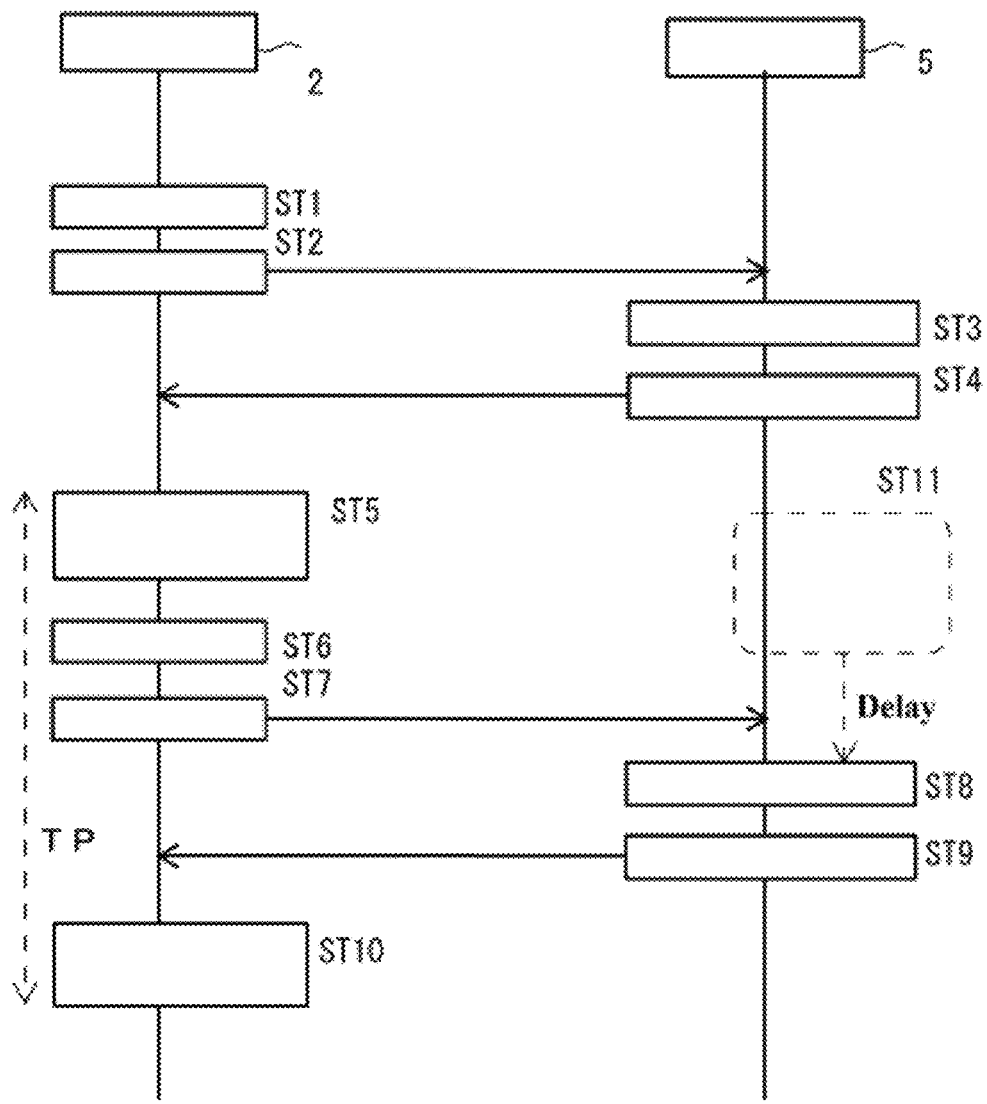
FIG. 4 is a timing chart describing a flow of traveling control by the vehicle server system of FIG. 1.

FIG. 4 is a timing chart describing a flow of traveling control at the vehicle server system 1 of FIG. 1.

FIG. 4 illustrates an example in which one vehicle 2 repeatedly transmits and receives data to and from the server apparatus 5 for remote traveling control via a communication system including, for example, the communication network 4. In FIG. 4, time passes from the top to the bottom.

First, in step ST1, the control system 10 of the vehicle 2 may acquire data on the own vehicle. The "data on the own vehicle" may also be referred to as "own vehicle data". In step ST2, the external communication apparatus 19 of the control system 10 may transmit the own vehicle data acquired in step ST1 to the server apparatus 5 via the base station 3 and the communication network 4. The own vehicle data may include data related to traveling of the own vehicle, including, for example, the location and the speed of the own vehicle during traveling. The server communication device 31 may receive respective pieces of own vehicle data from the vehicles 2. In step ST3, using the respective pieces of own vehicle data received from the vehicles 2 and the high-precision map data stored in the server memory 34, for example, the server CPU 35 of the server apparatus 5 may generate the traveling control values that allow the respective vehicles 2 to travel with safety. The traveling control values may include a value other than the value to be outputted to the driving control apparatus 11, the steering control apparatus 12, and the braking control apparatus 13. In step ST4, the server CPU 35 may transmit the generated traveling control values from the server communication device 31 to the respective vehicles 2 having transmitted the own vehicle data. The external communication apparatus 19 of the control system 10 of the vehicle 2 may receive the traveling control value from the server apparatus 5. In step ST5, the traveling control apparatus 15 of the vehicle 2 may control the traveling of the own vehicle by using the remote traveling control value acquired by reception.

From step ST6 to step ST10, the control system 10 of the vehicle 2 and the server apparatus 5 may repeat processes similar to those of steps ST1 to ST5. This makes it possible for the vehicle 2 to keep traveling under the remote traveling control by the server apparatus 5.

In this way, the server apparatus 5 of the vehicle server system 1 is able to remotely control the traveling of the vehicles 2.

Such a server apparatus 5, which remotely controls the traveling of the vehicles 2 in real time, is expected to be high in data processing capability. The larger the number of vehicles to undergo traveling control by the vehicle server system 1, the higher the data processing capability demanded of the server apparatus 5. The vehicle server system 1 may thus be expected to include multiple server apparatuses 5 to achieve enhancement of the data processing capability.

On the other hand, increasing the performance of each server apparatus 5 or the number of server apparatuses 5 for use in the vehicle server system 1 can lead to concern about, for example, apparent transmission delays between the server apparatuses 5 and increases in system cost.

Thus, improvements are demanded of a system including the vehicle and the server apparatus 5.

One possible approach may be that the vehicle server system 1 for traveling control on the vehicles 2 is used for a purpose other than the traveling control on the vehicles 2 to thereby disperse and compensate the increases in the system cost.

FIG. 5 is an explanatory diagram illustrating an example of various kinds of control to be executed by the server apparatus 5 in the vehicle server system 1 of FIG. 1.

In FIG. 5, as examples of the control to be executed by the server apparatus 5, listed are map update, location correction control, vehicle management control, travel log analysis control, and user service control, as well as traveling control.

The map update may be update control on map data to be used for traveling control, for example. The map update may include updating the high-precision map data itself and generating map data supplementing the high-precision map data. The map data for supplementing may include, for example, temporary data to be generated for some reason such as road work, and map data on rough roads different from normal roads.

The location correction control may be processing of generating data for correcting the location of each vehicle 2. The location of each vehicle 2 can generate a certain error due to, for example, a difference in the kind of the positioning system, a difference in the kind of the GNSS receiver 25, or complexity of geographical features or road shape. The location correction control may be control to calculate statistical location error that can occur in location data of the vehicles 2, for example. By obtaining a correction value for such a location error, it is possible for the server apparatus 5 to grasp the location of each vehicle 2 more accurately.

The vehicle management control may be control to update programs and settings for the control apparatus 40 of the vehicle 2, for example.

The travel log analysis control may be control to analyze vehicle data (log data) obtained upon actual traveling of the vehicle 2, for example.

The user service control may be control to supply the vehicle 2 with a service that an occupant is to cause the vehicle 2 to execute. Non-limiting examples of such a service include a content provision service, a communication service, and a data processing and provision service such as data mining.

By performing such kinds of control, it is possible for the server apparatus 5 to provide a service of higher value to, for example, the traveling vehicles 2 than in a case of simply providing a traveling control service to the vehicles 2.

By allowing the vehicle server system 1 that executes traveling control on the vehicles 2 to be also usable for purposes other than the traveling control on the vehicles 2, an increased cost of the vehicle server system 1 becomes less likely to hinder widespread use of the vehicle server system 1.

However, as illustrated in FIG. 4, the server apparatus 5 that executes traveling control on the vehicles 2 is to continue to generate the traveling control values in substantially real time for traveling of the vehicles 2 that are communicating with the server apparatus 5. In a case where the server apparatus 5 executes processing other than the traveling control as illustrated in step ST11 in FIG. 4, the execution of such processing can cause a delay in timing at which the server apparatus 5 is to generate a next traveling control value. As a result, there is a possibility that the server apparatus 5 generates and transmits the traveling control value at a timing behind an intended timing of the start of a traveling control cycle TP that allows the vehicle 2 to stably control its traveling. In FIG. 4, timings of steps ST8 and ST9 can be delayed due to the execution of the processing in step ST11. This can result in a possibility that the vehicle 2 has not yet received and acquired a new traveling control value from the server apparatus 5 at a timing to execute traveling control in step ST10.

The vehicle server system 1 according to the present example embodiment may use the control apparatuses 40 of any vehicle 2 that is not currently in use for traveling for part of control to be executed by the server apparatus 5, for example. This makes it possible for the vehicle server system 1 to achieve a processing capability higher than that of the server apparatus 5 itself. In this case, the vehicle 2 not currently in use for traveling may be used thereafter for traveling. For example, the control apparatuses 40 of the vehicle 2 not currently in use for traveling may be so used as not to interfere with the originally intended use of the vehicle 2.

Next, a description is given of such cooperative control by the server apparatus 5 and the vehicle 2.

Figure 6:
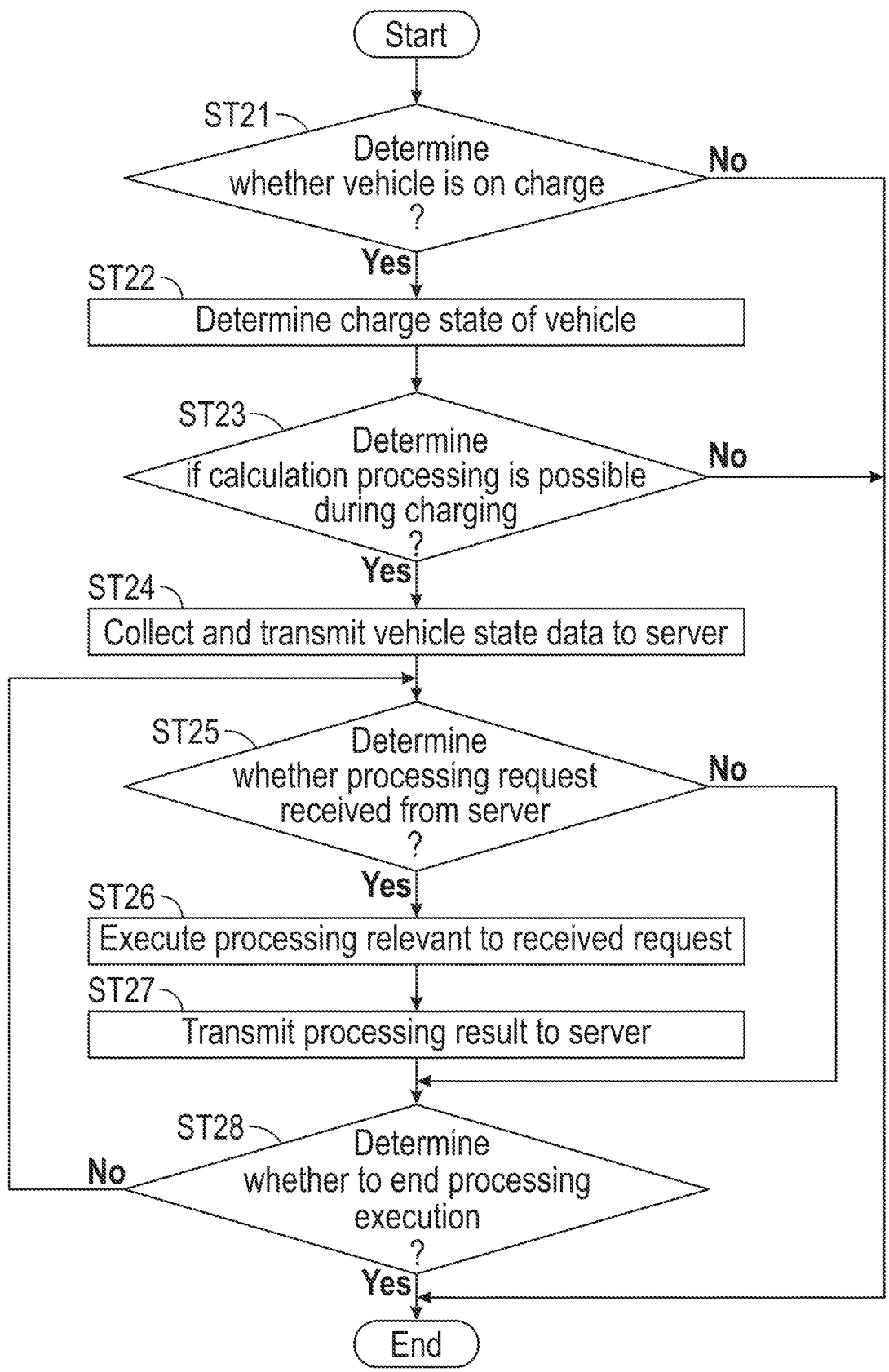
FIG. 6 is a flowchart of control during charging by the control system of FIG. 2 of the vehicle.

FIG. 6 is a flowchart of control during charging by the control system 10 of the vehicle 2 of FIG. 2.

In the control system 10 of the vehicle 2, the charging control apparatus 18 may include the calculation processing capability provided by the ECU 44, and may repeatedly execute the control during charging of FIG. 6.

The control during charging illustrated in FIG. 6 may be executed by any control apparatus 40 provided in the control system 10 of the vehicle 2 other than the charging control apparatus 18. For example, the CGW 20, which will be described later in relation to a third example embodiment, may repeatedly execute the control during charging of FIG. 6.

By executing the control during charging of FIG. 6, the charging control apparatus 18 may execute processing received from the server apparatus 5, that is, processing relevant to a processing request received from the server apparatus 5.

In step ST21, the ECU 44 of the charging control apparatus 18 may determine whether the own vehicle is on charge, that is, whether the own vehicle is being charged.

For example, in a case where a state of the charging control apparatus 18 has changed from a state of not being coupled to the charging apparatus 29 to a state of being coupled to the charging apparatus 29 as illustrated in FIG. 2, the ECU 44 of the charging control apparatus 18 may determine that the own vehicle is on charge. In this case, the ECU 44 of the charging control apparatus 18 may cause the flow to proceed to step ST22. In a case of not determining that the own vehicle is on charge, the ECU 44 of the charging control apparatus 18 may end this control. In addition, even in a case where the charging control apparatus 18 is coupled to the charging apparatus 29 as illustrated in FIG. 2, the ECU 44 of the charging control apparatus 18 may end this control if an end determination has been made in step ST28 to be described later.

In step ST22, the ECU 44 of the charging control apparatus 18 may determine, as a determiner, a charge state of the own vehicle. The ECU 44 of the charging control apparatus 18 may determine the charge state including, for example, an output voltage of the charging apparatus 29 coupled to the charging control apparatus 18, charging electric power, charging speed, remaining electric power of the battery of the own vehicle, and an estimated charging period until the battery is fully charged.

In step ST23, on the basis of the charge state determined in step ST22, the ECU 44 of the charging control apparatus 18 may determine whether it is possible for the own vehicle to execute calculation processing at the own vehicle during charging. For example, in a case where the remaining electric power of the battery of the own vehicle is sufficiently high, such as 80%, or in a case where the own vehicle is undergoing fast charging at a voltage of 200 V or more, the ECU 44 of the charging control apparatus 18 may determine that it is possible for the own vehicle to execute calculation processing at the own vehicle during charging. In this case, the ECU 44 of the charging control apparatus 18 may cause the flow to proceed to step ST24. In a case of not determining that it is possible for the own vehicle to execute calculation processing at the own vehicle during charging, the ECU 44 of the charging control apparatus 18 may end this control. This helps to prevent the battery of the vehicle 2 after charging from being in an insufficiently charged state.

In step ST24, the ECU 44 of the charging control apparatus 18 may collect data from each unit of the control system 10 of the own vehicle and transmit vehicle state data including the collected data to the server apparatus 5 from the external communication apparatus 19. At least in a case where it is determined that the own vehicle is on charge, the external communication apparatus 19 may transmit to the server apparatus 5 the vehicle state data indicating that the vehicle 2 is on charge. The vehicle state data may include, for example, the current location and time generated by the GNSS receiver 25, the charge state of the own vehicle determined in step ST22, and data of the ECUs 44 of the various control apparatuses 40 provided in the control system 10 of the vehicle 2.

In step ST25, the ECU 44 of the charging control apparatus 18 may determine whether any processing has been received from the server apparatus 5, that is, whether a processing request for any processing has been received from the server apparatus 5. The server CPU 35 of the server apparatus 5 may transmit a processing request for, for example, part of processing that the server CPU 35 is to execute, from the server communication device 31 to the vehicle 2 that is on charge. The ECU 44 of the charging control apparatus 18 may determine whether the processing request has been received from the server apparatus 5 on the basis of whether the external communication apparatus 19 has received the processing request from the server apparatus 5. In a case where the processing request for any processing has been received, the ECU 44 of the charging control apparatus 18 may cause the flow to proceed to step ST26. In a case where no processing request has been received, the ECU 44 of the charging control apparatus 18 may cause the flow to proceed to step ST28.

In step ST26, the ECU 44 of the charging control apparatus 18 may execute the processing relevant to the processing request received from the server apparatus 5. The ECU 44 of the charging control apparatus 18 may execute by itself the processing relevant to the processing request received from the server apparatus 5. Alternatively, the ECU 44 of the charging control apparatus 18 may cause any of the other control apparatuses 40 provided in the control system to execute the processing relevant to the processing request received from the server apparatus 5. The ECU 44 of the charging control apparatus 18 may select, as appropriate, the control apparatus 40 to execute the processing relevant to the processing request received from the server apparatus 5, from among the multiple control apparatuses 40 provided in the control system 10.

In step ST27, the ECU 44 of the charging control apparatus 18 may transmit, from the external communication apparatus 19 to the server apparatus 5, a processing result for the processing relevant to the processing request received from the server apparatus 5. This makes it possible for the server CPU 35 of the server apparatus 5 to acquire the processing result for, for example, part of processing that the server CPU 35 is to execute, without having to execute the part of the processing by itself. This reduces processing load on the server CPU 35 of the server apparatus 5.

In step ST28, the ECU 44 of the charging control apparatus 18 may determine whether to end the execution of the processing relevant to the processing request received from the server apparatus 5. Here, the ECU 44 of the charging control apparatus 18 may determine the latest charge state of the own vehicle. In a case where, for example, charging is not advancing or where the remaining electric power of the battery of the own vehicle has decreased, the ECU 44 of the charging control apparatus 18 may determine to end the execution of the processing relevant to the processing request received from the server apparatus 5. In this case, the ECU 44 of the charging control apparatus 18 may end this control. In a case of not determining to end the execution of the processing relevant to the processing request received from the server apparatus 5, the ECU 44 of the charging control apparatus 18 may cause the flow to return to step ST25. The ECU 44 of the charging control apparatus 18 may repeat processes from step ST25 to step ST28 until it is determined that the execution of the processing relevant to the processing request received from the server apparatus 5 is to end. Meanwhile, the ECU 44 of the charging control apparatus 18 may receive processing requests for multiple pieces of processing from the server apparatus 5 and transmit multiple processing results to the server apparatus 5.

Figure 7:
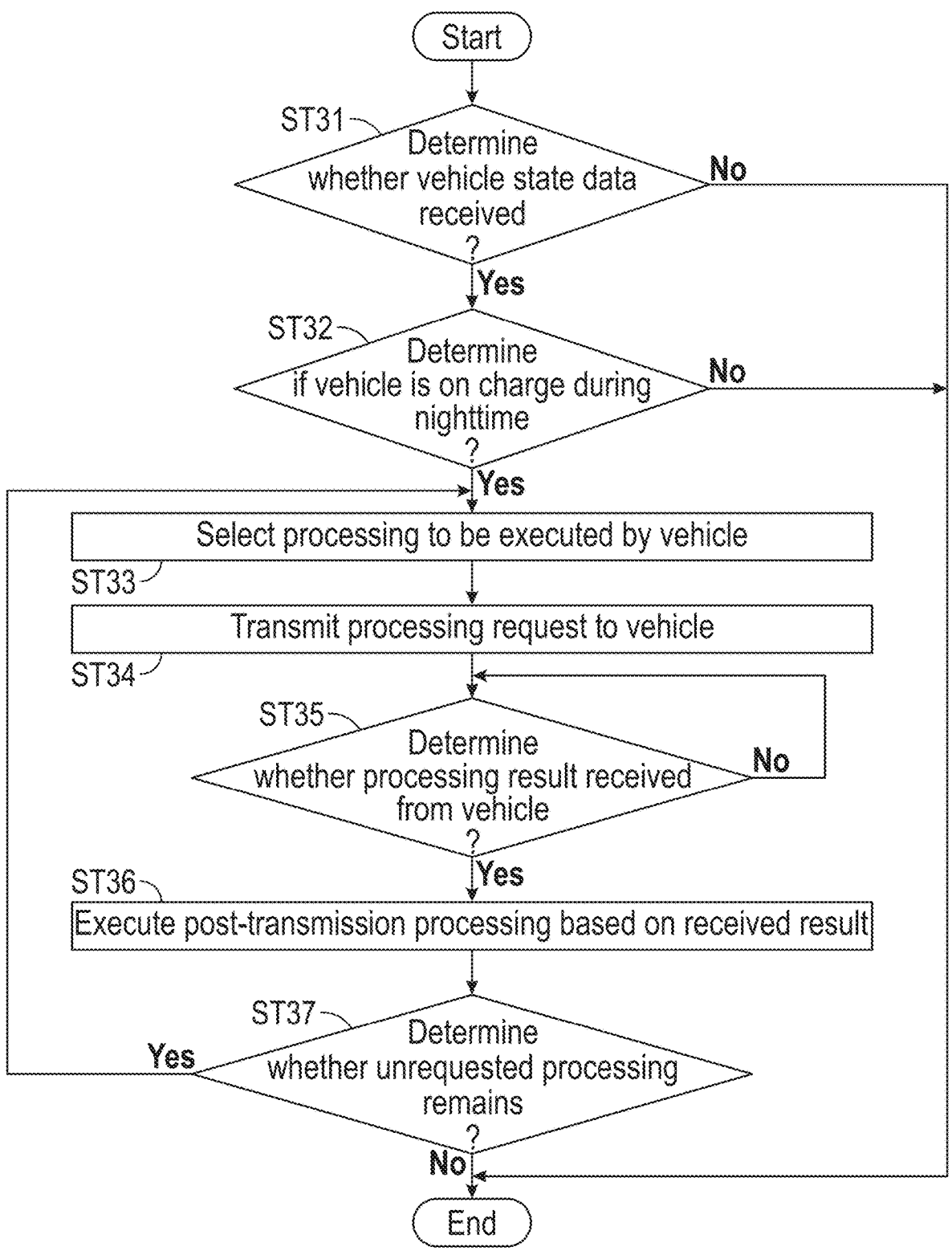
FIG. 7 is a flowchart of vehicle-calculation use control by the server apparatus of FIG. 3.

FIG. 7 is a flowchart of vehicle-calculation use control by the server apparatus 5 of FIG. 3.

The server CPU 35 of the server apparatus 5 may repeatedly execute the vehicle-calculation use control of FIG. 7.

Executing the vehicle-calculation use control of FIG. 7 makes it possible for the server CPU 35 to use the calculation processing capabilities of the control apparatuses 40 of the vehicle 2 during charging in the nighttime. This helps to avoid interfering with the originally intended use of the vehicle 2, as it is less likely that the vehicle is used by an occupant immediately after charging in the nighttime.

In step ST31, the server CPU 35 may determine whether the vehicle state data has been received from any vehicle 2. The charging control apparatus 18 of the vehicle 2 on charge may transmit the vehicle state data in step ST24 of FIG. 6. In a case where there is no vehicle 2 from which the vehicle state data has been received, the server CPU 35 may end this control without causing any vehicle 2 to execute processing. In a case where there is any vehicle 2 from which the vehicle state data has been received, the server CPU 35 may cause the flow to proceed to step ST32.

In step ST32, the server CPU 35 may determine whether time of a location where the vehicle 2 from which the vehicle state data has been received is on charge is nighttime. The server CPU 35 may determine whether the location included in the vehicle state data for the vehicle 2 on charge belongs to a region where time is during predetermined nighttime hours. Here, the nighttime hours may be from 12:00 a.m. to 6:00 a.m. in standard time for each region. The nighttime hours may vary from region to region, or from month to month, for example. The server CPU 35 may determine whether the time included in the vehicle state data for the vehicle 2 on charge is during the predetermined nighttime hours.

Here, the server CPU 35 may generate a list of the vehicles 2 that are on charge in the nighttime and available.

On the basis of reception of the vehicle state data by the server communication device 31, the server CPU 35 of the server apparatus 5 is able to determine whether the time of the location where the vehicle 2 from which the vehicle state data has been received is on charge is nighttime.

In step ST33, the server CPU 35 may select processing to be executed by any vehicle 2 that is on charge in the nighttime and available. The processing to be selected here may be part of processing for traveling control on the vehicles 2, for example. Further, the processing to be selected may be part of processing of one of the kinds of server control of FIG. 5. The server CPU 35 may divide the whole processing for the server control of FIG. 5 into multiple pieces of processing and may select one of them. In a case where the vehicle state data includes data on the estimated charging period and the calculation processing capabilities of the control apparatuses 40 available in the vehicle 2, the server CPU 35 may select processing that is executable within that time period and by calculation using the processing capabilities. On the basis of the list of the vehicles 2 on charge in the nighttime and available, the server CPU 35 may allocate executable processing to each of those vehicles 2.

Here, the server CPU 35 may select processing that involves a calculation amount appropriate to the estimated charging period for the vehicle 2.

In step ST34, the server CPU 35 may transmit a processing request for the processing selected in step ST33 to the vehicle 2 on charge in the nighttime. The processing request for the processing selected in step ST33 may be transmitted from the server communication device 31 to the external communication apparatus 19 of the vehicle 2. The charging control apparatus 18 of the vehicle 2 may, in step ST26 of FIG. 6, execute the processing relevant to the processing request from the server apparatus 5 using the calculation processing capabilities of the control apparatuses 40, including the charging control apparatus 18 itself, provided in the control system of the vehicle 2. Upon completion of the processing, in step ST27 of FIG. 6, the charging control apparatus 18 of the vehicle 2 may transmit the processing result to the server apparatus 5 from the external communication apparatus 19.

In step ST35, the server CPU 35 may determine whether the processing result by the vehicle 2 on charge in the nighttime has been received for the processing selected in step ST33. In a case where no processing result has been received, the server CPU 35 may repeat this process. Upon receiving the processing result, the server CPU 35 may cause the flow to proceed to step ST36.

In step ST36, the server CPU 35 may execute a post-transmission process on the processing relevant to the processing result provided by the vehicle 2 on charge in the nighttime. For example, in a case of having transmitted a processing request for part of the processing for traveling control as the processing to be executed by the vehicle 2 on charge in the nighttime, the server CPU 35 may execute post-processing of incorporating and reflecting the received processing result into the processing for traveling control to be executed by the server CPU 35 itself.

In step ST37, the server CPU 35 may determine whether any processing remains unrequested among pieces of processing to be executed by the vehicle 2 on charge in the nighttime. In a case where there remains any processing unrequested, the server CPU 35 may cause the flow to return to step ST33. In a case where no processing remains unrequested, the server CPU 35 may end this control.

In this way, it is possible for the server CPU 35 to cause any of the control apparatuses 40 of any of the vehicles 2 on charge in the nighttime to execute processing of some of the kinds of server control listed in FIG. 5. In a case where a vehicle 2 is on charge but not in the nighttime, the server apparatus 5 may refrain from causing the control apparatuses 40 of the vehicle 2 to execute any processing.

Figure 8:
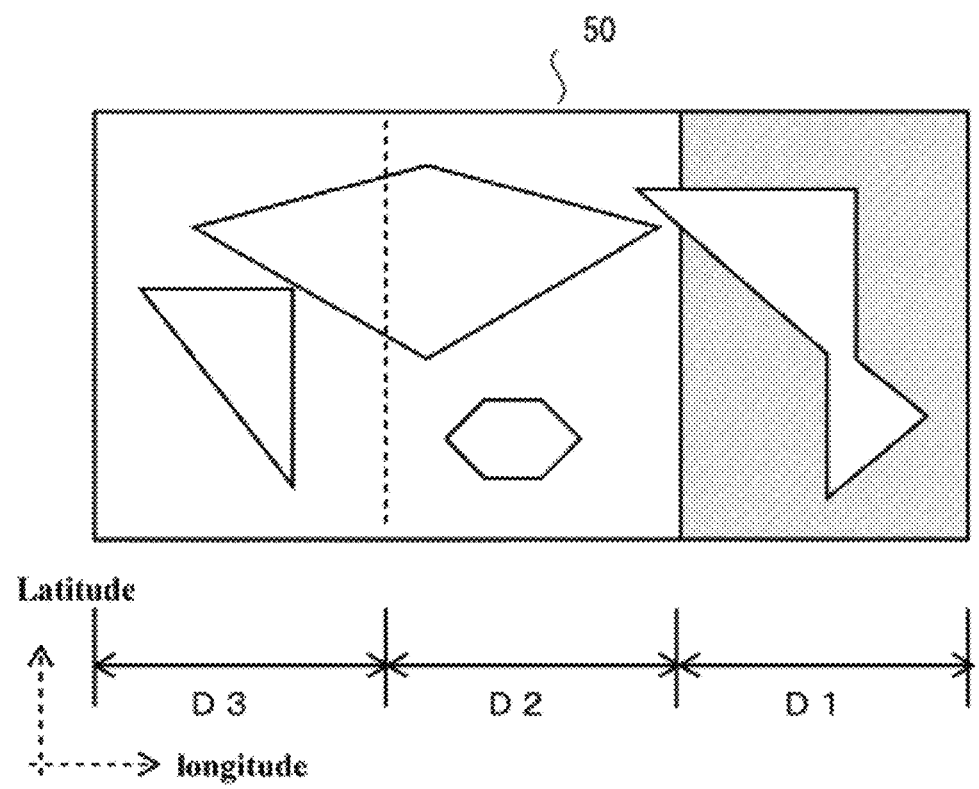
FIG. 8 is an explanatory diagram illustrating an example of nighttime determination by the server apparatus of FIG. 3.

FIG. 8 is an explanatory diagram illustrating an example of nighttime determination by the server apparatus of FIG. 3.

FIG. 8 illustrates a schematic world map 50. On the world map 50, the world is divided into three regions: a first region D1, a second region D2, and a third region D3, for each longitude range of 120 degrees.

In a case of determining whether the time of the location where the vehicle 2 is on charge is nighttime in step ST32 of FIG. 7, the server CPU 35 may determine which one of the regions D1 to D3 the location where the vehicle 2 is on charge belongs to. In this case, the server CPU of the server apparatus 5 is to determine whether the location where the vehicle 2 from which the vehicle state data has been received is on charge belongs to, among three or more terrestrial regions defined by dividing the earth on the basis of longitude, one terrestrial region where time is nighttime.

In FIG. 8, time is nighttime in the first region D1 which is hatched. In this case, if the location where the vehicle 2 is on charge belongs to the first region D1, the server CPU 35 may determine that the time of the location where the vehicle 2 is on charge is nighttime. If the location where the vehicle 2 is on charge belongs to the second region D2 or the third region D3, the server CPU 35 may determine that the time of the location where the vehicle 2 is on charge is not nighttime.

Note that the world may be divided into regions on the basis of latitude instead of longitude. Alternatively, the world may be divided into regions on the basis of longitude and latitude. Alternatively, the world may be divided by country. In this case, the nighttime hours may be based on the time in each country.

In this way, by at least determining whether the time of the location where the vehicle 2 is on charge is nighttime, it is possible for the server CPU 35 to determine whether the time of the location where the vehicle 2 from which the vehicle state data has been received is on charge is nighttime.

As described above, the vehicle server system 1 according to the present example embodiment includes the vehicle 2 and the server apparatus 5. The vehicle 2 is chargeable and includes at least the control apparatus 40 and the external communication apparatus 19. The control apparatus 40 includes the calculation processing capability. The vehicle 2 may transmit the vehicle state data to the server apparatus 5 via the external communication apparatus 19, and the server apparatus 5 may receive the vehicle state data from the vehicle 2 via the server communicator. The server processor of the server apparatus 5 determines whether the time of the location where the vehicle 2 from which the vehicle state data has been received is on charge is nighttime. In a case where the vehicle 2 is on charge in the nighttime, the server CPU 35 executes control to cause the control apparatus 40 including the calculation processing capability in the vehicle 2 to execute processing. In a case where the vehicle 2 is on charge but not in the nighttime, the server CPU 35 may refrain from executing the control to cause the control apparatus 40 including the calculation processing capability in the vehicle 2 to execute processing.

Thus, the server CPU 35 of the server apparatus 5 is able to cause the control apparatus 40 including the calculation processing capability in the vehicle 2 on charge in the nighttime to execute part of processing that the server CPU 35 is to execute for traveling control on the vehicle 2. Further, the server CPU 35 is able to cause the control apparatus 40 including the calculation processing capability in the vehicle 2 on charge in the nighttime to execute, for example, processing that is not directly related to traveling control on the vehicle 2 by the server CPU 35. This helps to reduce processing load on the server CPU 35 of the server apparatus 5. Further, in the vehicle 2, it is possible to efficiently use the control apparatus 40 including the calculation processing capability that is not in use during charging of the vehicle 2 in the nighttime. The cooperation between the vehicle 2 and the server apparatus 5 configuring the vehicle server system 1 makes it possible to enhance the overall processing capability of the vehicle server system 1. For example, the world may be divided into three or more regions of a predetermined longitude range, and whether time is nighttime may be identified for each region. This helps to enable the vehicle server system 1 to stably provide a processing capability higher than that of the server apparatus 5 itself.

In addition, according to the present example embodiment, a case where the vehicle 2 is caused to execute processing is limited to where the time of the location where the vehicle 2 is on charge is nighttime, instead of causing the vehicle 2 to execute processing simply on the basis of the fact that the vehicle 2 is on charge. As a result, for example, in a case where the vehicle 2 is on charge during an interim of continuous use, such as during daytime hours, it is possible to refrain from causing the control apparatus 40 including the calculation processing capability in the vehicle 2 to execute processing during the charging. This helps to reduce a possibility that appropriate charging is hindered due to execution of processing by the control apparatus 40 including the calculation processing capability while the vehicle 2 is being used for a purpose such as traveling. According to the present example embodiment, it is possible to cause the control apparatus 40 including the calculation processing capability to execute processing in such a manner as not to interfere with the originally intended use of the vehicle 2.

For example, in the present example embodiment, determination as to whether the time of the location where the vehicle 2 from which the vehicle state data has been received is on charge is nighttime may be made by using three or more terrestrial regions defined by dividing the earth on the basis of at least longitude. According to the present example embodiment, it is thus possible to limit a time period identifiable as nighttime to about eight hours. In the present example embodiment, to adapt to typical human activities, for example, the control apparatus 40 including the calculating processing capability is allowed to execute processing such as part of processing for the server apparatus 5 during a time period in which the vehicle 2 is unlikely to be used. Further, in the present example embodiment, the server apparatus 5 may define three or more regions on the earth by diving the earth on the basis of at least longitude, and may determine whether time is nighttime for each of the three or more regions. It is expected to be possible for the server apparatus 5 to continuously receive assistance from the control apparatuses 40 including the calculation processing capabilities in the vehicles 2, in relation to processing executed at the vehicles 2 that are on charge in one or more terrestrial regions on the earth.

In the present example embodiment, the vehicle 2 may determine the charge state thereof and may transmit, at least in a case of determining that the vehicle 2 is on charge, the vehicle state data indicating that the vehicle 2 is on charge. On the basis of reception of the vehicle state data by the server communicator, the server CPU 35 of the server apparatus 5 may determine whether time of the location where the vehicle 2 from which the vehicle state data has been received is on charge is nighttime. Thus, only in a case of being accessed by a vehicle 2 on charge, the server apparatus 5 is able to cause the control apparatus 40 including the calculation processing capability in the vehicle 2 to execute processing. The server apparatus 5 is able to distinguish between the vehicle 2 on charge and the vehicle 2 that is simply parked in the nighttime, and is able to cause, only in the vehicle 2 on charge, the control apparatus 40 including the calculation processing capability to execute processing.

Note that in the present example embodiment, the server apparatus 5 may use the calculation processing capability of the control apparatus 40 of a vehicle 2 only in the case where the vehicle 2 is on charge in the nighttime.

As another example, the server apparatus 5 may use the calculation processing capability of the control apparatus 40 of a vehicle 2 also in, for example, a case where the vehicle 2 is traveling by manual driving, and a case where the vehicle 2 is not on charge but is parked in a highly charged state. An occupant may set, using the touch panel 24 of the vehicle 2, conditions under which the server apparatus 5 is able to use the calculation processing capability of the own vehicle.

Second Example Embodiment

Next, a vehicle server system 1 according to a second example embodiment of the disclosure will be described. The following description includes description of differences from the foregoing example embodiment.

Figure 9:
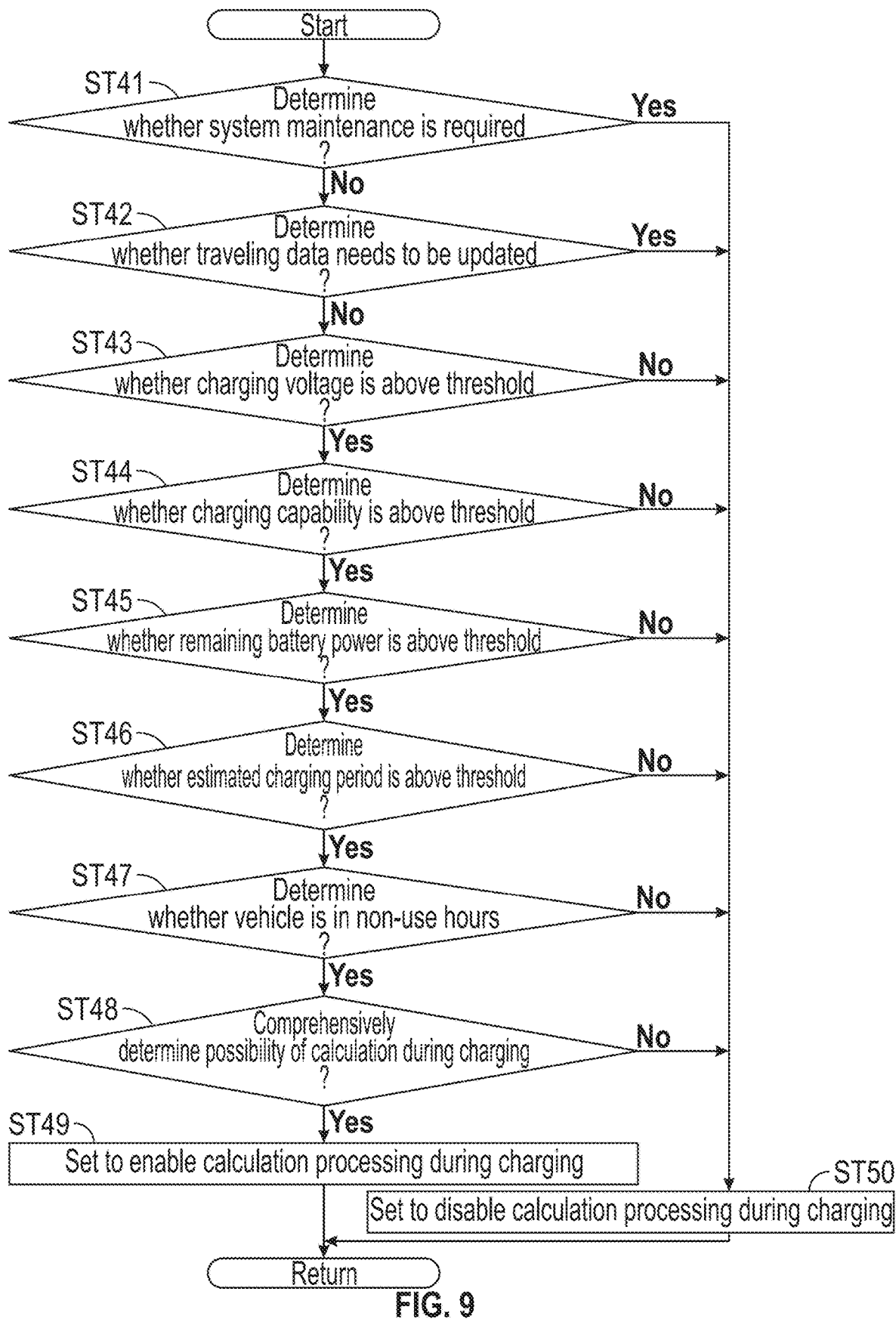
FIG. 9 is a flowchart of charge-state determination control by the control system of the vehicle in one example embodiment of the disclosure.

FIG. 9 is a flowchart of charge-state determination control by the control system 10 of the vehicle 2 in the second example embodiment of the disclosure.

The ECU 44 of the charging control apparatus 18 of the vehicle 2 may execute the charge-state determination control of FIG. 9 in, for example, step ST22 of FIG. 6.

In step ST41, the ECU 44 of the charging control apparatus 18 may determine whether system maintenance is to be done for the vehicle 2.

After shipment of the vehicle 2, there is a possibility of updates of a program to be executed by the ECU 44 of the control apparatus 40 including the calculation processing capability in the vehicle 2 and data such as parameters to be used for execution of the program, for example. The ECU 44 of the charging control apparatus 18 may communicate with the server apparatus 5 to confirm whether there is update data for the own vehicle, and may, in a case where there is data updatable by communication, determine that system maintenance is to be done for the vehicle 2. In this case, the ECU 44 of the charging control apparatus 18 may cause the flow to proceed to step ST50 without executing various determination processes described below. The ECU 44 of the charging control apparatus 18 may execute the system maintenance on the vehicle 2 on charge by communication with the server apparatus 5. In a case where there is no update data, or in a case where the process of updating the data has been completed, the ECU 44 of the charging control apparatus 18 may cause the flow to proceed to step ST42.

In step ST42, the ECU 44 of the charging control apparatus 18 may determine whether data of the vehicle 2 obtained during traveling is to be updated. During traveling, the vehicle 2 may capture images of the outside of the vehicle 2 with the exterior camera 26, generate outside-vehicle space data with the LiDAR 27, and generate data on the traveling state of the own vehicle with the GNSS receiver 25 or the acceleration sensor 28. These pieces of detection data obtained during traveling may be accumulated as log data in the control system 10 of the vehicle 2. In a case where there are such pieces of detection data obtained during traveling, the ECU 44 of the charging control apparatus 18 may determine that the data during traveling of the vehicle 2 is to be updated. In this case, the ECU 44 of the charging control apparatus 18 may cause the flow to proceed to step ST50 without executing various determination processes described below. The ECU 44 of the charging control apparatus 18 may upload data such as the detection data of the vehicle 2 obtained during traveling to the server apparatus 5. In a case without any data such as the detection data obtained during traveling or in a case where uploading of data such as the detection data obtained during traveling has been completed, the ECU 44 of the charging control apparatus 18 may cause the flow to proceed to step ST43.

In step ST43, the ECU 44 of the charging control apparatus 18 may determine whether a charging voltage of the charging apparatus 29 is at or above a threshold for the charging voltage. Examples of the charging apparatus 29 for the vehicle 2 may include one configured to execute charging with a commercial voltage of 200 V and one configured to execute charging with a commercial voltage of 100 V. In this case, the threshold for the charging voltage may be set to 120 V, for example. In a case where the charging voltage of the charging apparatus 29 is, for example, 200 V and is at or above the threshold, the ECU 44 of the charging control apparatus 18 may cause the flow to proceed to step ST44. In a case where the charging voltage of the charging apparatus 29 is, for example, 100 V and is not at or above the threshold, the ECU 44 of the charging control apparatus 18 may cause the flow to proceed to step ST50.

In step ST44, the ECU 44 of the charging control apparatus 18 may determine whether a charging capability of the charging apparatus 29 is at or above a threshold for the capability. Some of the charging apparatuses 29 for the vehicles 2 may be able to perform fast charging at a commercial voltage of 200 V. In a case where, for example, the charging capability of the charging apparatus 29 coupled to the own vehicle for charging allows fast charging, the ECU 44 of the charging control apparatus 18 may determine that the charging capability is at or above the threshold, and may cause the flow to proceed to step ST45. Otherwise, the ECU 44 of the charging control apparatus 18 may cause the flow to proceed to step ST50.

Regarding the determinations as to the charge state in steps ST43 and ST44, the ECU 44 may refrain from executing those determinations.

For example, in a case where the remaining electric power of the battery to be determined in step ST45 is at a level that will not hinder daily traveling in the neighborhood, such as 70% or more, it is assumable that there is still time before charging becomes necessary even in a case of charging at a commercial voltage of 100 V. In this case, the ECU 44 may, for example, omit the determination in step ST43 or change the threshold for use in the determination to below 100 V, such as 80V, depending on a setting change made by the user.

In addition, in a case of charging at home, there is a possibility that the charging is not fast charging but normal charging at 200 V, or in some cases, not fast charging but normal charging at 100 V. In this case, the ECU 44 may, for example, omit the determination in step ST44 or change the threshold for use in the determination to 200 V or 100 V under normal charging, not fast charging, depending on a setting change made by the user.

In step ST45, the ECU 44 of the charging control apparatus 18 may determine whether the remaining electric power of the battery is at or above a threshold for the remaining electric power. Here, the threshold for the remaining electric power may be 80%, for example. In a case where the remaining electric power of the battery is at or above the threshold, the ECU 44 of the charging control apparatus 18 may cause the flow to proceed to step ST46. Otherwise, the ECU 44 of the charging control apparatus 18 may cause the flow to proceed to step ST50.

In step ST46, the ECU 44 of the charging control apparatus 18 may determine whether the estimated charging period is at or above a threshold for the estimated charging period. The threshold for the estimated charging period may be one hour, for example. In a case where the estimated charging period is at or above the threshold, the ECU 44 of the charging control apparatus 18 may cause the flow to proceed to step ST47. Otherwise, the ECU 44 of the charging control apparatus 18 may cause the flow to proceed to step ST50.

In step ST47, the ECU 44 of the charging control apparatus 18 may determine whether the vehicle 2 is in non-use hours during which the vehicle 2 is not in use. An occupant of the vehicle 2 may register a use schedule of the vehicle 2 using, for example, the touch panel 24 of the vehicle 2. The occupant of the vehicle 2 may also register his/her schedule in his/her unillustrated mobile terminal or personal computer. The ECU 44 of the charging control apparatus 18 may acquire these pieces of data from the own vehicle or from the server apparatus 5 to determine a time when the vehicle 2 is likely to be used next. If one or more hours are left before the time, the ECU 44 of the charging control apparatus 18 may determine that the vehicle 2 is in the non-use hours during which the vehicle 2 is not in use. The ECU 44 of the charging control apparatus 18 may also determine that the vehicle 2 is in the non-use hours during which the vehicle 2 is not in use on the basis of data on daily use hours of the vehicle 2. In a case where the vehicle 2 is in the non-use hours during which the vehicle 2 is not in use, the ECU 44 of the charging control apparatus 18 may cause the flow to proceed to step ST48. Otherwise, the ECU 44 of the charging control apparatus 18 may cause the flow to proceed to step ST50.

In step ST48, the ECU 44 of the charging control apparatus 18 may comprehensively determine whether it is possible to execute processing that uses the calculation processing capability of the control apparatus 40 of the own vehicle during charging. The ECU 44 of the charging control apparatus 18 may determine whether it is possible to execute processing that uses the calculation processing capability of the control apparatus 40 of the own vehicle during charging on the basis of, for example, data to be used in executing the processes from step ST41 to step ST47. For example, in a case where the estimated charging period is very long although the remaining electric power is above the threshold, the ECU 44 of the charging control apparatus 18 may determine that it is difficult to execute processing that uses the calculation processing capability of the control apparatus 40 of the own vehicle during charging. In this case, the ECU 44 of the charging control apparatus 18 may cause the flow to proceed to step ST50. Otherwise, the ECU 44 of the charging control apparatus 18 may cause the flow to proceed to step ST49.

In step ST49, the ECU 44 of the charging control apparatus 18 may execute a setting to enable calculation processing during charging.

In step ST50, the ECU 44 of the charging control apparatus 18 may execute a setting to disable calculation processing during charging.

In this way, the ECU 44 of the charging control apparatus 18 may execute the setting to enable or disable calculation processing during charging in step ST22 of FIG. 6. In this case, in step ST23 of FIG. 6, the ECU 44 of the charging control apparatus 18 is able to determine whether it is possible for the own vehicle to execute calculation processing at the own vehicle during charging, on the basis of the setting made by this control as to the calculation processing during charging.

As has been described, according to the present example embodiment, the ECU 44 of the charging control apparatus 18 of the vehicle 2 may determine the charge state of the own vehicle, for example. In the case where it is possible to execute processing that uses the calculation processing capability of the control apparatus 40 of the own vehicle during charging, the ECU 44 of the charging control apparatus 18 may transmit to the server apparatus 5 the vehicle state data indicating that the vehicle 2 is on charge. The vehicle 2 may give a higher priority to, for example, the charge state and the maintenance of the own vehicle than to the processing to be executed by the control apparatus 40 including the calculation processing capability in the vehicle 2 on charge in the nighttime. As a result, the vehicle 2 after charging is less likely to remain in an uncharged state in spite of having been charged. The use of the vehicle 2 after charging is thus less likely to be hindered.

In the present example embodiment, in steps ST41 to ST48, the ECU 44 of the charging control apparatus 18 of the vehicle 2 may make determinations related to whether to transmit the vehicle state data.

In another example, the ECU 44 of the charging control apparatus 18 of the vehicle 2 may determine whether to transmit the vehicle state data on the basis of determinations in some of steps ST41 to ST48 or other determinations.

For example, an occupant is able to make settings, including enabling or disabling of the calculation processing capability during charging, and a condition for enabling thereof, on the vehicle 2 by using the touch panel 24 of the vehicle 2. In this case, the ECU 44 of the charging control apparatus 18 of the vehicle 2 may make determinations related to whether to transmit the vehicle state data on the basis of the settings made by the occupant. Some occupants may intend to positively provide the calculation processing capability of the vehicle 2 to the server apparatus 5 in order to get points based on, for example, the amount of calculation. The occupant may set an order of priority between the kinds of server control listed in FIG. 5. The occupant may set the order of priority in such a manner as to give a higher priority to processing for which points, even if not many, are to be surely rewarded, or to processing for which many points are to be rewarded even if the possibility of successfully completing the processing is low. Some of data processing and provision services, including data mining which is a kind of user service, may yield a high return.

Third Example Embodiment

Next, a vehicle server system 1 according to a third example embodiment of the disclosure will be described. The following description includes description of differences from the foregoing example embodiments.

FIG. 10 is a basic hardware configuration diagram illustrating the control apparatus 40 to be used in the control system 10 of FIG. 2 of the vehicle 2.

The control apparatus 40 of FIG. 10 may include an input and output device 41, a timer 42, a memory 43, the ECU 44, and an internal bus 45. The input and output device 41, the timer 42, the memory 43, and the ECU 44 may be coupled to the internal bus 45.

The input and output device 41 may be coupled to the vehicle network. The input and output device 41 may acquire, from the vehicle network, a packet in which an ID of itself is included in destinations. The input and output device 41 may output, to the vehicle network, a packet with a destination ID and the ID of itself as the transmission source added thereto. The packet outputted to the vehicle network may undergo routing control on an as-needed basis by the CGW 20 and supplied to the control apparatus 40 identified with the destination ID. It is thus possible for each control apparatus 40 to supply and receive data to and from the other control apparatuses 40 provided in the control system 10.

The timer 42 may measure a time and a time period. The time of the timer 42 may be calibrated by the current time of the GNSS receiver 25 provided in the own vehicle.

The memory 43 may hold a program to be executed by the ECU 44, and data.

The ECU 44 may read the program from the memory 43 and execute the program. This enables a processor to be implemented in the control apparatus 40.

As illustrated in FIG. 2, the control system 10 of the vehicle 2 may include, for example, the driving control apparatus 11, the steering control apparatus 12, the braking control apparatus 13, the operation detection apparatus 14, the traveling control apparatus 15, the detection control apparatus 16, the air conditioning apparatus 17, the charging control apparatus 18, and the external communication apparatus 19. Further, the CGW 20 to which these control apparatuses may be coupled may also be one of the control apparatuses 40 provided in the control system of the vehicle 2. Each control apparatus 40 may have the basic hardware configuration illustrated in FIG. 10. In this case, the control system 10 of the vehicle 2 may include multiple ECUs 44. The ECU 44 may be a calculation processing device provided in the control apparatus 40. The control system 10 of the vehicle 2 may thus include multiple calculation processing devices.

However, the ECUs 44 as the calculation processing devices may be basically different from each other in performance. Referring to an example in FIG. 2, ECUs 44 that provide high calculation processing capabilities may typically be used for the detection control apparatus 16 configured to process captured images, for example, and the traveling control apparatus 15. Further, for the operation detection apparatus 14 to which the touch panel 24 may be coupled, an ECU 44 that provides a high calculation processing capability may typically be used for performing image processing on, for example, a high-precision moving image to be displayed on the touch panel 24. In contrast, for the driving control apparatus 11, the steering control apparatus 12, the braking control apparatus 13, and the air conditioning apparatus 17, ECUs 44 that each provide a certain processing capability lower than that of an ECU 44 for image processing may typically be used.

Further, in a case where the vehicle 2 is on charge, the charging control apparatus 18 is to operate. In addition, as a security measure, the detection control apparatus 16 is to monitor the inside and the outside of the vehicle 2 parked for charging. In one example, the charging control apparatus 18 and the detection control apparatus 16 may be excluded from the control apparatuses 40 selectable to execute processing for the server apparatus 5.

Figure 11:
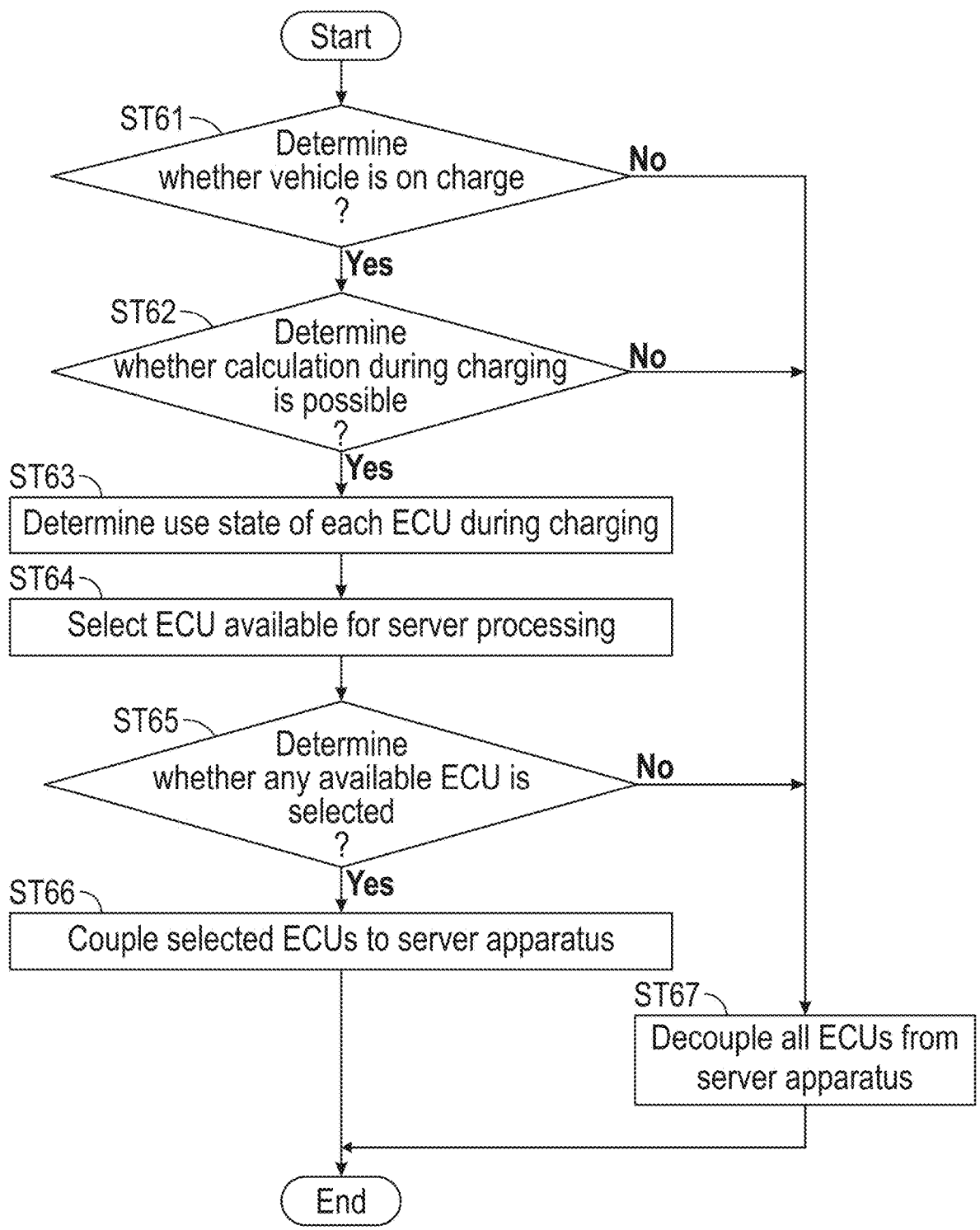
FIG. 11 is a flowchart of selection control to select an electronic control unit (ECU) as a calculation processing device in the control system of the vehicle in one example embodiment of the disclosure.

FIG. 11 is a flowchart of selection control to select the ECU 44 as the calculation processing device in the control system 10 of the vehicle 2 in the third example embodiment of the disclosure.

The ECU 44 of, for example, the CGW 20 among the control apparatuses 40 provided in the control system 10 may repeatedly execute the selection control of FIG. 11.

Alternatively, the ECU 44 of another control apparatus 40 provided in the control system may repeatedly execute the selection control of FIG. 11.

Note that the control apparatuses 40 included in the control system 10 may be coupled to the CGW 20. The CGW 20 is to operate for a purpose such as routing of packets between, for example, the external communication apparatus 19 and the charging control apparatus 18 even if the vehicle 2 is on charge. The CGW 20, which is to operate even in a state where the vehicle 2 is not traveling and which is able to directly supply and receive data to and from the other control apparatuses 40, may be suitable to execute the control of FIG. 11. To cause any control apparatus 40 that is nonoperating during charging to operate only for the purpose of the control of FIG. 11 would lead to excessive consumption of the charged electric power, and would thus reduce efficiency of charging.

In step ST61, the ECU 44 of the CGW 20 may determine whether the own vehicle is on charge. In step ST21 of the control during charging in FIG. 6, the charging control apparatus 18 in the control system 10 of the vehicle 2 may determine whether the own vehicle is on charge. The ECU 44 of the CGW 20 may make the determination as to whether the own vehicle is on charge on the basis of whether the ECU 44 of the charging control apparatus 18 determines that the own vehicle is on charge. In a case where the own vehicle is not on charge, the ECU 44 of the CGW 20 may cause the flow to proceed to step ST67. In a case where the own vehicle is on charge, the ECU 44 of the CGW 20 may cause the flow to proceed to step ST62.

In step ST62, the ECU 44 of the CGW 20 may determine whether it is possible to execute calculation processing at the own vehicle during charging. In step ST23 of the control during charging in FIG. 6, the charging control apparatus 18 in the control system 10 of the vehicle 2 may determine whether it is possible to execute calculation processing at the own vehicle during charging. The ECU 44 of the CGW 20 may make the determination as to whether it is possible to execute calculation processing at the own vehicle during charging on the basis of whether the ECU 44 of the charging control apparatus 18 determines that it is possible to execute calculation processing during charging. In a case where it is difficult to execute calculation processing during charging, the ECU 44 of the CGW 20 may cause the flow to proceed to step ST67. In a case where it is possible to execute calculation processing during charging, the ECU 44 of the CGW 20 may cause the flow to proceed to step ST63.

In step ST63, the ECU 44 of the CGW 20 may determine a use state of the ECU 44 of each control apparatus 40 during charging. During charging, the vehicle 2 is basically not traveling. Thus, the ECUs 44 of the control apparatuses 40 included in the control system 10, excluding the charging control apparatus 18, may not be in use. This holds true also for the ECU 44 of the external communication apparatus 19 and the ECU 44 of the CGW 20 at timings other than when communicating with the server apparatus 5. In contrast, as the vehicle 2 on charge is parked for charging, the ECU 44 of the detection control apparatus 16 may be in use continuously even during charging, for purposes including security and monitoring of the vehicle 2.

On the basis of these operation states in the vehicle 2, the ECU 44 of the CGW 20 may determine the use state of the ECU 44 of each control apparatus 40 during charging. In the above-described case, the ECU 44 may determine that the ECUs 44 are in use for at least the charging control apparatus 18 and the detection control apparatus 16 among the charging control apparatus 18, the external communication apparatus 19, the CGW 20, and the detection control apparatus 16. For the other control apparatuses 40 in the control system 10, the ECU 44 of the CGW 20 may determine that the ECUs 44 are not in use. In a case where a setting to disable monitoring, for example, is made by an occupant, the ECU 44 of the CGW 20 may determine that the ECU 44 of the detection control apparatus 16, which would otherwise operate for monitoring during parking, is not in use, either.

In step ST64, on the basis of the use-state determination in step ST63, the ECU 44 of the CGW 20 may select an ECU 44 that is available for execution of processing for the server apparatus 5. The ECU 44 of the CGW 20 may select, among the ECUs 44 of the control apparatuses 40 in the control system 10, an EUC 44 that is unlikely to be continuously used during charging, as the ECU 44 available for execution of the processing for the server apparatus 5. Examples of such an ECU 44 may include the ECUs 44 of the driving control apparatus 11, the steering control apparatus 12, the braking control apparatus 13, the operation detection apparatus 14, the traveling control apparatus 15, and the air conditioning apparatus 17. In a case where the traveling control apparatus 15 which includes a high calculation processing capability is among the control apparatuses 40 that are unlikely to be continuously used, the ECU 44 of the CGW 20 may select only the ECU 44 of the traveling control apparatus 15 as the ECU 44 available for execution of the processing for the server apparatus 5. For the ECUs 44 of some of the control apparatuses 40 that are not high in calculation processing capability, the ECU 44 of the CGW 20 may refrain from selecting such ECUs 44 as the ECU 44 available for execution of the processing for the server apparatus 5, even if those ECUs 44 are not in use during charging. Examples of such ECUs 44 may include those of the driving control apparatus 11, the steering control apparatus 12, the braking control apparatus 13, and the operation detection apparatus 14.

The ECU 44 of the CGW 20 may thus select the ECU 44 of, for example, the traveling control apparatus 15 or the air conditioning apparatus 17 as the ECU 44 available for execution of processing for the server apparatus 5, by excluding the ECU 44 of at least the detection control apparatus 16 which may be operating as a monitoring apparatus during charging.

In step ST65, the ECU 44 of the CGW 20 may determine whether any ECU 44 available for execution of processing for the server apparatus 5 has been selected. In a case where no ECU 44 available for execution of processing for the server apparatus 5 has been selected, the ECU 44 of the CGW 20 may cause the flow to proceed to step ST67. In a case where at least one ECU 44 available for execution of processing for the server apparatus 5 has been selected, the ECU 44 of the CGW 20 may cause the flow to proceed to step ST66.

In step ST66, the ECU 44 of the CGW 20 may couple the ECU 44 available for execution of processing for the server apparatus 5 to the server apparatus 5. The external communication apparatus 19 may be provided with an IP address by, for example, the base station 3, and may thus be distinguishably couplable to the communication network 4 to which the server apparatus 5 is coupled. In this case, the ECU 44 of the CGW 20 may set a port for each ECU 44 available for execution of processing for the server apparatus 5 between itself and the server CPU 35 of the server apparatus 5, and may thereby couple the ECU 44 available for execution of processing for the server apparatus 5 to the server apparatus 5. Thus, the server apparatus 5 is able to designate the ECU 44 to be used for execution of the processing for the server apparatus 5 in the control system 10 of the vehicle 2 by specifying the IP address and the port. The ECU 44 of the CGW 20 may cause the ECU 44 corresponding to the port specified by the server apparatus 5 to execute the processing for which the processing request has been received from the server apparatus 5. Further, the ECU 44 of the CGW 20 may transmit a processing result provided by the ECU 44 to the server apparatus 5 from the same port.

Thereafter, the ECU 44 of the CGW 20 may end this control.

In this way, the server apparatus 5 is able to use the ECU 44 selected as available by the ECU 44 of the CGW 20 for execution of, for example, part of processing for the server apparatus 5.

Further, in a case where multiple ports are coupled for one vehicle 2, the server CPU 35 of the server apparatus 5 may use the multiple ports to cause the multiple ECUs 44 of one vehicle 2 to execute multiple pieces of processing for the server apparatus 5. The server apparatus 5 is able to use multiple ECUs 44 selected as available by the ECU 44 of the CGW 20 in parallel for execution of multiple processing for the server apparatus 5. In this way, the server CPU 35 of the server apparatus 5 is able to transmit processing requests for pieces of processing directly to the respective ECUs available in the vehicle 2 on an individual basis. In a case where such direct transmission of the processing requests is difficult, the server CPU 35 may be able to simply transmit a single processing request for a single piece of processing to all the CPUs 44 even if multiple ECUs 44 are available in one vehicle 2. In a case where multiple ECUs 44 are not configured to cooperate with each other in one vehicle 2, it is difficult to make full use of the multiple ECUs 44 available in the vehicle 2.

For example, in a case where the ECU 44 of the CGW 20 selects any of the ECUs 44 excluding the ECU 44 of the detection control apparatus 16 serving as the monitoring apparatus, the server apparatus 5 is able to cause multiple control apparatuses 40, excluding at least the detection control apparatus 16 serving as the monitoring apparatus, to execute multiple pieces of processing.

In the vehicle 2 on charge in the nighttime, processing for the server apparatus 5 and other processing are efficiently executable by the ECUs of the multiple control apparatuses 40.

In step ST67, the ECU 44 of the CGW 20 may decouple all the ECUs 44 of the own vehicle from the server apparatus 5. As a result, in the vehicle 2 on charge in the nighttime, none of the ECUs 44 of the control apparatuses 40 are coupled to the server apparatus 5. This allows the vehicle 2 on charge in the nighttime to be efficiently charged, without executing any processing such as processing for the server apparatus 5.

As described above, according to the present example embodiment, the server CPU 35 of the server apparatus 5 is able to execute the control to cause the control apparatuses 40 provided in the vehicle 2 on charge in the nighttime, excluding at least the monitoring apparatus, to execute processing. The vehicle 2 is thus able to execute the processing such as part of processing for the server apparatus 5 while allowing the detection control apparatus 16, which serves as the monitoring apparatus even during charging, to keep monitoring the vehicle 2. According to the present example embodiment, it is possible for the server CPU 35 to efficiently use the control apparatuses 40 provided in the vehicle 2 in such a manner as not to interfere with the operation of the vehicle 2 on charge.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the vehicle server system according to at least one embodiment of the disclosure, the vehicle is chargeable, and includes at least the control apparatus and the external communication apparatus. The control apparatus includes the calculation processing capability. The server apparatus includes the server communicator and the server processor. The server communicator is communicable with the external communication apparatus of the vehicle. The vehicle and the server apparatus are communicable with each other in order to execute at least traveling control on the vehicle. Further, according to at least one embodiment of the disclosure, the server processor determines whether time of the location where the vehicle from which the vehicle state data has been received is on charge is nighttime. In a case where the vehicle is on charge in the nighttime, the server processor executes control to cause the control apparatus including the calculation processing capability in the vehicle to execute processing.

The server processor of the server apparatus is thus able to cause, in the vehicle on charge in the nighttime, the control apparatus including the calculation processing capability to execute processing, such as part of processing for the server processor. As a result, processing load on the server apparatus of the vehicle server system is reduced. Further, it is possible for the vehicle to efficiently use the calculation processing capability thereof in a case where the vehicle is on charge in the nighttime and not in use. In this way, according to the vehicle server system of at least one embodiment of the disclosure, the vehicle on charge in the nighttime and the server apparatus are able to cooperate with each other to execute control such as vehicle traveling control. The vehicle server system thus achieves high overall processing capability that would not be achievable with the server apparatus by itself.

Moreover, according to at least one embodiment of the disclosure, the high processing capability that would not be achievable with the server apparatus by itself is efficiently used for the vehicle server system during charging of the vehicle in the nighttime, during which the vehicle is likely to become continuously available to the vehicle server system. It is thus expected that the high processing capability is securable with stability. Accordingly, in at least one embodiment of the disclosure, it is possible to save the performance or the number of server apparatuses to be prepared for the vehicle server system.

In at least one embodiment of the disclosure, such assignment of processing to the vehicle is carried out only in a case where time of the location where the vehicle is on charge is nighttime, not simply on the basis of the fact that the vehicle is on charge. Execution of the processing at the vehicle is limited to during charging in the nighttime. As a result, for example, in a case where the vehicle is on charge during an interim of continuous use, such as during daytime hours, it is possible to cause the vehicle to refrain from executing any processing for the server apparatus during the charging. The vehicle is thus able to refrain from using the calculation processing capability thereof to execute any process for the server apparatus in the case of being charged during an interim of use for traveling, for example. If the calculation processing capability of the vehicle is used to execute processing while the vehicle is being charged during an interim of use for any purpose such as traveling, it can become difficult for the vehicle to be appropriately charged with sufficient power for subsequent traveling, in spite of execution of the charging. According to at least one embodiment of the disclosure, it is possible to efficiently use the calculation processing capability of the vehicle for execution of, for example, processing for the server apparatus in such a manner as not to interfere with the originally intended use of the vehicle.

The server CPU 35 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the server CPU 35 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the server CPU 35 illustrated in FIG. 3.

The invention claimed is:

1. A vehicle server system comprising:
vehicles each of which is chargeable and comprises at least an external communication apparatus, and a control apparatus configured to execute calculation processing; and
a server apparatus comprising:
a server communicator configured to communicate with the external communication apparatus of each vehicle; and
a server processor communicably coupled to the server communicator and configured to execute at least traveling control processing to control the vehicles on a basis of data transmitted and received by the server communicator, wherein
the server communicator is configured to receive vehicle state data from a first vehicle of the vehicles,
the server processor is configured to:
determine whether the first vehicle is charging and whether a local time at a location of the first vehicle corresponds to a predetermined nighttime period; and
upon determining that the first vehicle is charging and the time corresponds to the nighttime period, select a partial task of the traveling control processing, the partial task being a process that is originally executable by the server processor and offloaded to the first vehicle to reduce a processing load on the server processor; and
transmit a request to the first vehicle to execute the partial task,
the control apparatus of the first vehicle is configured to perform the partial task of the traveling control processing,
the server processor is configured to, upon receiving a result of performing the partial task from the first vehicle, incorporate the result into the traveling control processing to perform the traveling control processing for one or more vehicles traveling a road segment,
the server processor is further configured to:
upon determining that the first vehicle is charging and the time corresponds to the nighttime period, select a calculation processing including data mining; and
transmit a request to the first vehicle to execute the calculation processing including the data mining, and
the control apparatus of the first vehicle is configured to:
determine whether a charging voltage of a charging apparatus coupled to the control apparatus is at or above a threshold of the charging voltage; and
perform, in response to determining that the charging voltage of the charging apparatus is at or above the threshold of the charging voltage, the calculation processing including the data mining.

2. The vehicle server system according to claim 1, wherein the server processor of the server apparatus is configured to determine whether the time at the location where the first vehicle is parked is nighttime, by at least determining whether the location where the vehicle is charging belongs to a terrestrial region where time is nighttime, the terrestrial region being one of three or more terrestrial regions defined by dividing the earth on a basis of at least longitude.

3. The vehicle server system according to claim 2, wherein
the first vehicle comprises an ECU configured to determine a charge state of the vehicle,
the external communication apparatus of the vehicle is configured to, at least in a case where the ECU determines that the vehicle is charging, transmit the vehicle state data indicating that the first vehicle is charging, and
the server processor of the server apparatus is configured to determine whether the time of the location where the vehicle from which the vehicle state data is received is charging is nighttime, on a basis of reception of the vehicle state data by the server communicator.

4. The vehicle server system according to claim 3, wherein the external communication apparatus of the first vehicle is configured to control transmission of the vehicle state data indicating that the first vehicle is charging, by making one or more of:
a determination as to whether a charging voltage or a charging capability of the first vehicle is at or above a predetermined threshold;
a determination as to whether an estimated charging period for the first vehicle is at or above a predetermined threshold;
a determination as to whether a remaining electric power of the first vehicle that is charging is at or above a predetermined threshold;
a determination as to whether the charge state of the first vehicle is a state that allows charging to be accomplished even if the control apparatus is caused to execute the calculation processing;
a determination as to whether the first vehicle is in non-use hours during which the first vehicle is not in use by an occupant; and
a determination as to whether system maintenance by communication is to be done for the first vehicle that is charging, or whether detection data of the first vehicle is to be uploaded.

5. The vehicle server system according to claim 4, wherein
the control apparatus comprises multiple control apparatuses comprising a monitoring apparatus for the first vehicle, and
the server processor is configured to execute control to cause any of the control apparatuses in the first vehicle that is charging in the nighttime, excluding the monitoring apparatus, to execute the calculation processing.

6. The vehicle server system according to claim 3, wherein
the control apparatus comprises multiple control apparatuses comprising a monitoring apparatus for the first vehicle, and
the server processor is configured to execute control to cause any of the control apparatuses in the first vehicle that is charging the nighttime, excluding the monitoring apparatus, to execute the calculation processing.

7. The vehicle server system according to claim 2, wherein the control apparatus comprises multiple control apparatuses comprising a monitoring apparatus for the first vehicle, and the server processor is configured to execute control to cause any of the control apparatuses in the first vehicle that is charging in the nighttime, excluding the monitoring apparatus, to execute the calculation processing.

8. The vehicle server system according to claim 1, wherein the first vehicle comprises an electronic control unit (ECU) configured to determine a charge state of the vehicle, the external communication apparatus of the vehicle is configured to, at least in a case where the ECU determines that the vehicle is charging, transmit the vehicle state data indicating that the first vehicle is charging, and the server processor of the server apparatus is configured to determine whether the time of the location where the vehicle from which the vehicle state data is received is charging is nighttime, on a basis of reception of the vehicle state data by the server communicator.

9. The vehicle server system according to claim 8, wherein the external communication apparatus of the first vehicle is configured to control transmission of the vehicle state data indicating that the first vehicle is charging, by making one or more of:

a determination as to whether a charging voltage or a charging capability of the first vehicle is at or above a predetermined threshold;

a determination as to whether an estimated charging period for the first vehicle is at or above a predetermined threshold;

a determination as to whether a remaining electric power of the first vehicle that is charging is at or above a predetermined threshold;

a determination as to whether the charge state of the first vehicle is a state that allows charging to be accomplished even if the control apparatus is caused to execute the calculation processing;

a determination as to whether the first vehicle is in non-use hours during which the first vehicle is not in use by an occupant; and a determination as to whether system maintenance by communication is to be done for the first vehicle that is charging, or whether detection data of the first vehicle is to be uploaded.

10. The vehicle server system according to claim 9, wherein the control apparatus comprises multiple control apparatuses comprising a monitoring apparatus for the first vehicle, and the server processor is configured to execute control to cause any of the control apparatuses in the first vehicle that is charging in the nighttime, excluding the monitoring apparatus, to execute the calculation processing.

11. The vehicle server system according to claim 8, wherein the control apparatus comprises multiple control apparatuses comprising a monitoring apparatus for the first vehicle, and the server processor is configured to execute control to cause any of the control apparatuses in the first vehicle that is charging in the nighttime, excluding the monitoring apparatus, to execute the calculation processing.

12. The vehicle server system according to claim 1, wherein the control apparatus comprises multiple control apparatuses comprising a monitoring apparatus for the first vehicle, and the server processor is configured to execute control to cause any of the control apparatuses in the first vehicle that is charging in the nighttime, excluding the monitoring apparatus, to execute the calculation processing.

13. The vehicle server system according to claim 1, wherein the server communicator and the server processor are coupled to a server bus.

* * * * *